US012017659B2

(12) United States Patent
Mukundan et al.

(10) Patent No.: US 12,017,659 B2
(45) Date of Patent: Jun. 25, 2024

(54) VEHICLE-ORIGINATED WIRELESS SAFETY ALERT

(71) Applicant: QUALCOMM Incorporated, San Diego, CA (US)

(72) Inventors: Sameesh Edathumpadikkal Mukundan, Bangalore (IN); Venkateshwarlu Sadu, Hyderabad (IN); Sean Vincent Maschue, Encinitas, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/650,549

(22) Filed: Feb. 10, 2022

(65) Prior Publication Data

US 2023/0249693 A1 Aug. 10, 2023

(51) Int. Cl.
*B60W 40/09* (2012.01)
*B60W 50/14* (2020.01)
*G06V 20/54* (2022.01)
*G06V 20/58* (2022.01)
(Continued)

(52) U.S. Cl.
CPC ............ *B60W 40/09* (2013.01); *B60W 50/14* (2013.01); *G06V 20/54* (2022.01); *G06V 20/58* (2022.01);
(Continued)

(58) Field of Classification Search
CPC .................. B60W 40/09; B60W 50/14; B60W 2540/221; B60W 2540/30; B60W 2756/10; G06V 20/54; G06V 20/58; G06V 40/18; G06V 40/20; G06V 20/56; G06V 40/193; G06V 20/597; H04W 4/40; G08G 1/0112; G08G 1/0133; G08G 1/0141; G08G 1/052;
(Continued)

(56) References Cited

U.S. PATENT DOCUMENTS

2014/0375810 A1    12/2014   Rodriguez
2015/0254978 A1*   9/2015    Mawbey ................. B60Q 1/52
                                                          340/902
(Continued)

FOREIGN PATENT DOCUMENTS

EP            3249626 A1        11/2017

OTHER PUBLICATIONS

International Search Report and Written Opinion—PCT/US2022/080435—ISA/EPO—Mar. 2, 2023.
(Continued)

*Primary Examiner* — Thomas S McCormack
(74) *Attorney, Agent, or Firm* — Thien T. Nguyen

(57) ABSTRACT

Erratic driving behavior may be detected at an origination vehicle based on sensor information at the origination vehicle. Techniques further provide for generating alert message that includes an indication of the detection of the erratic driving behavior as well as location and/or heading of the vehicle this message can be wirelessly transmitted from the origination vehicle. Techniques may further provide for propagating the message at a receiving device by receiving a first alert message at the receiving device indicative of the location, heading, and/or detection of erratic driving behavior of the origination vehicle, and transmitting a second alert message with similar information.

30 Claims, 12 Drawing Sheets

(51) Int. Cl.
*G06V 40/18* (2022.01)
*G06V 40/20* (2022.01)
*H04W 4/40* (2018.01)

(52) U.S. Cl.
CPC ............... *G06V 40/18* (2022.01); *G06V 40/20* (2022.01); *H04W 4/40* (2018.02); *B60W 2540/221* (2020.02); *B60W 2540/30* (2013.01); *B60W 2756/10* (2020.02)

(58) Field of Classification Search
CPC ........ G08G 1/056; G08G 1/166; G08G 1/162; G08G 1/164
See application file for complete search history.

(56) References Cited

U.S. PATENT DOCUMENTS

| | | | |
|---|---|---|---|
| 2019/0088041 A1* | 3/2019 | Lee | H04W 4/46 |
| 2020/0111355 A1 | 4/2020 | Alcazar et al. | |
| 2021/0166557 A1* | 6/2021 | Chen | A61B 5/18 |
| 2021/0316720 A1* | 10/2021 | Dewey | G06Q 40/08 |
| 2022/0046391 A1* | 2/2022 | Ong | H04W 4/08 |

OTHER PUBLICATIONS

Aggarwal, R., "Bi-LSTM", Jul. 4, 2019, 8 Pages, Retrieved from the Internet: URL: https://medium.com/@raghavaggarwal0089/bi-lstm-bc3d68da8bd0.

Sewalkar, P., et al., "Vehicle-to-Pedestrian Communication for Vulnerable Road Users: Survey, Design Considerations, and Challenges", Sensors, Communication Networks Group, Technical University of Ilmenau, 98693 Ilmenau, Germany, vol. 19, No. 2, Jan. 17, 2019, pp. 1-18.

Zhang, P., et al., "Psychological Stress Detection According to ECG Using a Deep Learning Model with Attention Mechanism", Applied Sciences, vol. 11, No. 6, 2848, Mar. 23, 2021, pp. 1-15, Retrieved from the Internet: URL: https://doi.org/10.3390/app11062848.

\* cited by examiner

VEHICLE-ORIGINATED WIRELESS SAFETY ALERT

BACKGROUND

High-speed pursuits (e.g., police pursuits) are widely acknowledged to be one of the most dangerous activities police undertake. These pursuits and other erratic or abnormal driving behavior can be deadly, often killing people in other vehicles, pedestrians, and other innocent bystanders. This may often be due to the fact that these people are unaware of the approaching danger. Currently there are no widely deployed systems that can identify and alert others of dangerous or erratic vehicle behavior.

BRIEF SUMMARY

Techniques described herein provide for detecting erratic driving behavior at an origination vehicle based on sensor information at the origination vehicle. Techniques further provide for generating an alert message that includes an indication of the detection of the erratic driving behavior as well as location and heading of the vehicle. This message can be wirelessly transmitted from the origination vehicle. Techniques may further provide for propagating the message at a receiving device by receiving a first alert message at the receiving device indicative of the location, heading, and detection of erratic driving behavior of the origination vehicle, and transmitting a second alert message with similar information.

An example method of providing erratic driving behavior detection and alerting at an origination vehicle, according to this disclosure, may comprise detecting, based on sensor information from one or more sensors of the origination vehicle, erratic driving behavior of the origination vehicle. The method also may comprise responsive to detecting the erratic driving behavior of the origination vehicle, generating an alert message at the origination vehicle, the alert message comprising: a location of the origination vehicle, a heading of the origination vehicle, or the detection of the erratic driving behavior of the origination vehicle, or any combinations thereof. The method also may comprise wirelessly transmitting the alert message from the origination vehicle.

An example method of propagating, at a receiving device, a first alert message of detected erratic driving behavior of an origination vehicle, according to this disclosure, may comprise receiving the first alert message at the receiving device, the first alert message comprising first information indicative of a location of the origination vehicle, a heading of the origination vehicle, and detection of the erratic driving behavior of the origination vehicle. The method also may comprise determining a second alert message with the receiving device. The method also may comprise transmitting the second alert message from the receiving device, the second alert message comprising second information indicative of: the location of the origination vehicle, the heading of the origination vehicle, or the detection of the erratic driving behavior of the origination vehicle, or any combinations thereof.

An example origination vehicle providing erratic driving behavior detection and alerting, according to this disclosure, may comprise one or more sensors, a transceiver, a memory, one or more processors communicatively coupled with the one or more sensors, the transceiver, and the memory, wherein the one or more processors are configured to detect, based on sensor information from the one or more sensors, erratic driving behavior of the origination vehicle. The one or more processors further may be configured to, responsive to detecting the erratic driving behavior of the origination vehicle, generate an alert message at the origination vehicle, the alert message comprising: a location of the origination vehicle, a heading of the origination vehicle, or the detection of the erratic driving behavior of the origination vehicle, or any combinations thereof. The one or more processors further may be configured to wirelessly transmit the alert message from the origination vehicle via the transceiver.

An example receiving device for propagating a first alert message of detected erratic driving behavior of an origination vehicle, according to this disclosure, may comprise one or more transceivers, a memory, one or more processors communicatively coupled with the one or more transceivers and the memory, wherein the one or more processors are configured to receive the first alert message via the one or more transceivers, the first alert message comprising first information indicative of: a location of the origination vehicle, a heading of the origination vehicle, and detection of the erratic driving behavior of the origination vehicle. The one or more processors further may be configured to determine a second alert message with the receiving device. The one or more processors further may be configured to transmit the second alert message via the one or more transceivers, the second alert message comprising second information indicative of: the location of the origination vehicle, the heading of the origination vehicle, or the detection of the erratic driving behavior of the origination vehicle, or any combinations thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
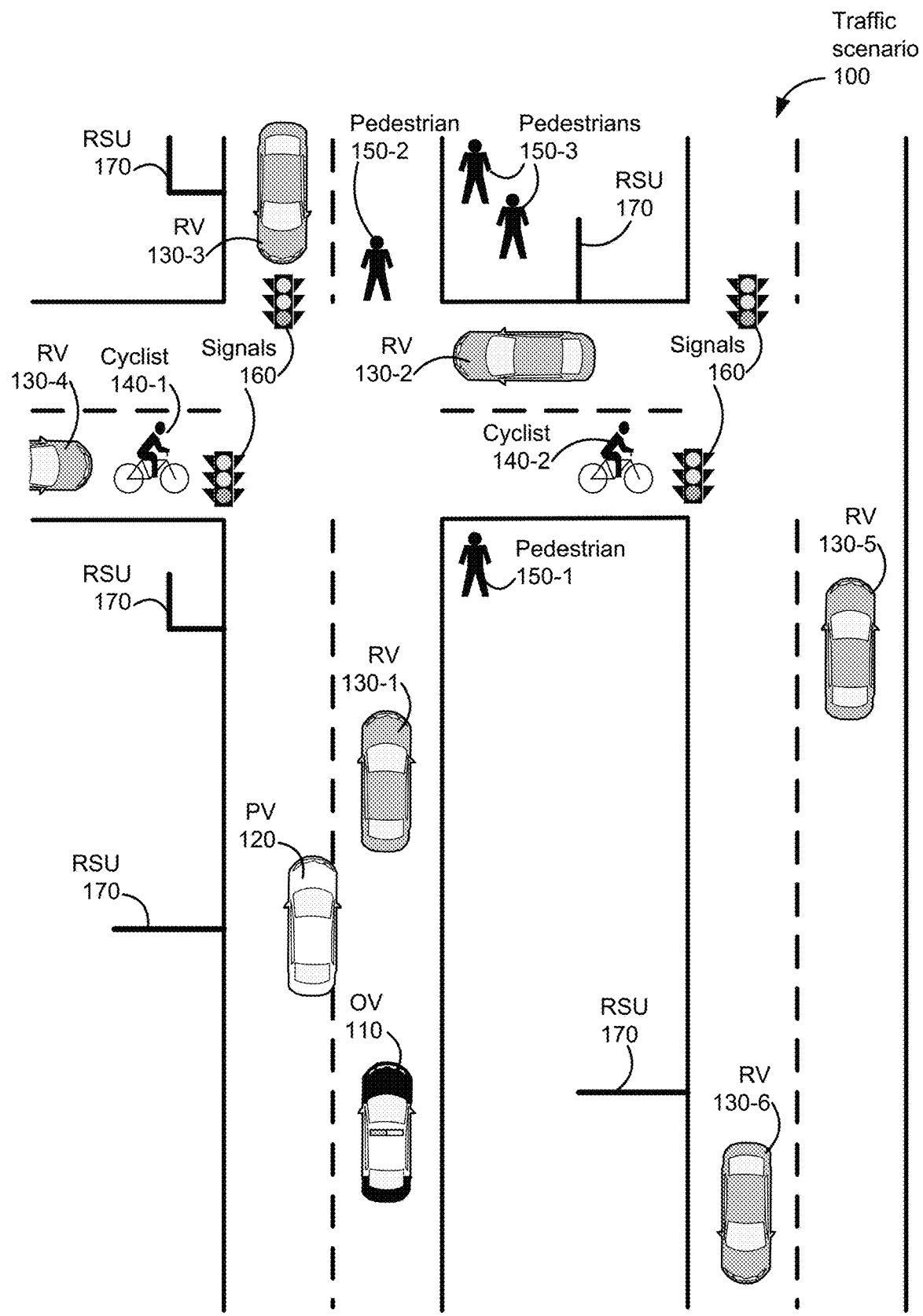
FIG. 1 is an overhead view depicting a traffic scenario in which erratic deriving may present a danger to multiple people.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology. Further, vehicle-related RF signals may be communicated using relevant wireless communication technologies and/or standards related to vehicle-to-vehicle (V2V), vehicle-to-infrastructure (V2I), vehicle-to-network (V2N), vehicle-to-pedestrian (V2P), and/or vehicle-to-everything (V2X) communication, or similar types of communication.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

As previously noted, high-police pursuits are widely acknowledged to be one of the most dangerous activities police undertake. According to study on motor vehicle crash deaths related to police pursuits, 300 lives are lost each year in the United States from police pursuit related crashes and one third of these are among innocent bystanders not being pursued by police. Dangerous driving behavior unrelated to police pursuits also can be deadly. This behavior can result from drunk driving, inattentive driving, drivers suffering from health-related issues, vehicle system malfunction, and so forth. As noted, much of the danger to bystanders is the fact that they may be unaware that a police pursuit or vehicle exhibiting erratic behavior is quickly approaching them. There are no widely deployed systems which can inform the VRU (Vulnerable Road User) devices, other vehicles, or signal control units at cross junctions in advance when these dangers are about to approach them.

FIG. 1 is an illustration depicting a traffic scenario 100 in which erratic deriving may present a danger to multiple people. In this example, the origination vehicle (OV) 110 comprises a police vehicle in pursuit of a pursued vehicle (PV) 120. Other vehicles in the figure are collectively and generically referred to as remote vehicles (RVs) 130. In V2X terminology, the OV 110 also may be referred to as a "host vehicle."

As can be seen, each RV 130 may be subject to a different level of danger from the police pursuit based on factors regarding the PV 120 and OV 110 such as location, direction of travel, speed etc. RV 130-1, for example, is relatively close to both PV 120 and OV 110, and therefore may be subject to the highest level of danger. RVs 130-2, 130-3, and 130-4 also may be subject to a high degree of danger due to their being located at an intersection the PV 120 and OV 110 are approaching. RV 130-5 may be subject to some danger if, for example, the PV 120 and OV 110 start heading in its direction, or if other vehicles move in the direction of RV 130-5 to avoid the PV 120 and OV 110. RV 130-6 may be subject to the lowest level of danger (of the RVs 130 depicted in FIG. 1), due to the fact that it is on another street and headed in a different direction than the PV 120 and OV 110.

Other entities in FIG. 1 also may be subject to danger from the police pursuit, and similar to RVs 130, each may be subject to a different level of danger. These other entities include VRUs such as pedestrians (collectively and generically referred to as pedestrians 150) and cyclists (or bicyclists; collectively and generically referred to as cyclists 140). Specifically, pedestrian 150-1 may be subject to a high level of danger due to being relatively close to the police pursuit. Pedestrian 150-2 also may be subject to a high level of danger due to being in the road in an intersection toward which PV 120 and OV 110 are approaching. Pedestrians 150-3 may be subject to a relatively lower level of danger due to the fact that they are not in the street and relatively distant from the police pursuit. That said, they still may be subject to some danger given the speed and direction in which PV 120 and OV 110 are traveling. Similar to RVs 130-2, 130-3, and 130-4, cyclist 140-1 may also be subject to danger due to being at an intersection toward which the police pursuit is approaching. Cyclist 140-2 may be subject to danger as well, although perhaps a slightly lower level of danger than cyclist 140-1, given the direction of travel of the cyclist 140-2 and slightly farther distance from PV 120 and OV 110.

Embodiments herein are directed toward a vehicle-originated wireless safety alert to help raise awareness of the danger presented by such a police pursuit, as well as other types of erratic/dangerous driving behavior, so that entities that are subject to danger are aware of the danger and are able to act accordingly. To generate the alert, embodiments provide for automatically detecting erratic behavior at a police car or other type of origination vehicle exhibiting erratic/dangerous driving behavior. As discussed in more detail hereafter, an analysis unit (e.g., a implementing an artificial intelligence (AI)/machine learning (ML)-based algorithm) may be used to detect the police pursuit or erratic driving behavior based on the various input parameters and transmitting an alert message to other devices and/or vehicles. Some devices (e.g., signals 160) may respond by managing traffic in a manner to help reduce dangers. Some devices that receive the alert (e.g., RVs 130 and/or roadside units (RSUs) 170) may implement certain propagation policies to help ensure the alert message is wirelessly propagated to one or more areas that may be impacted by the police pursuit/erratic driving behavior.

Figure 2:
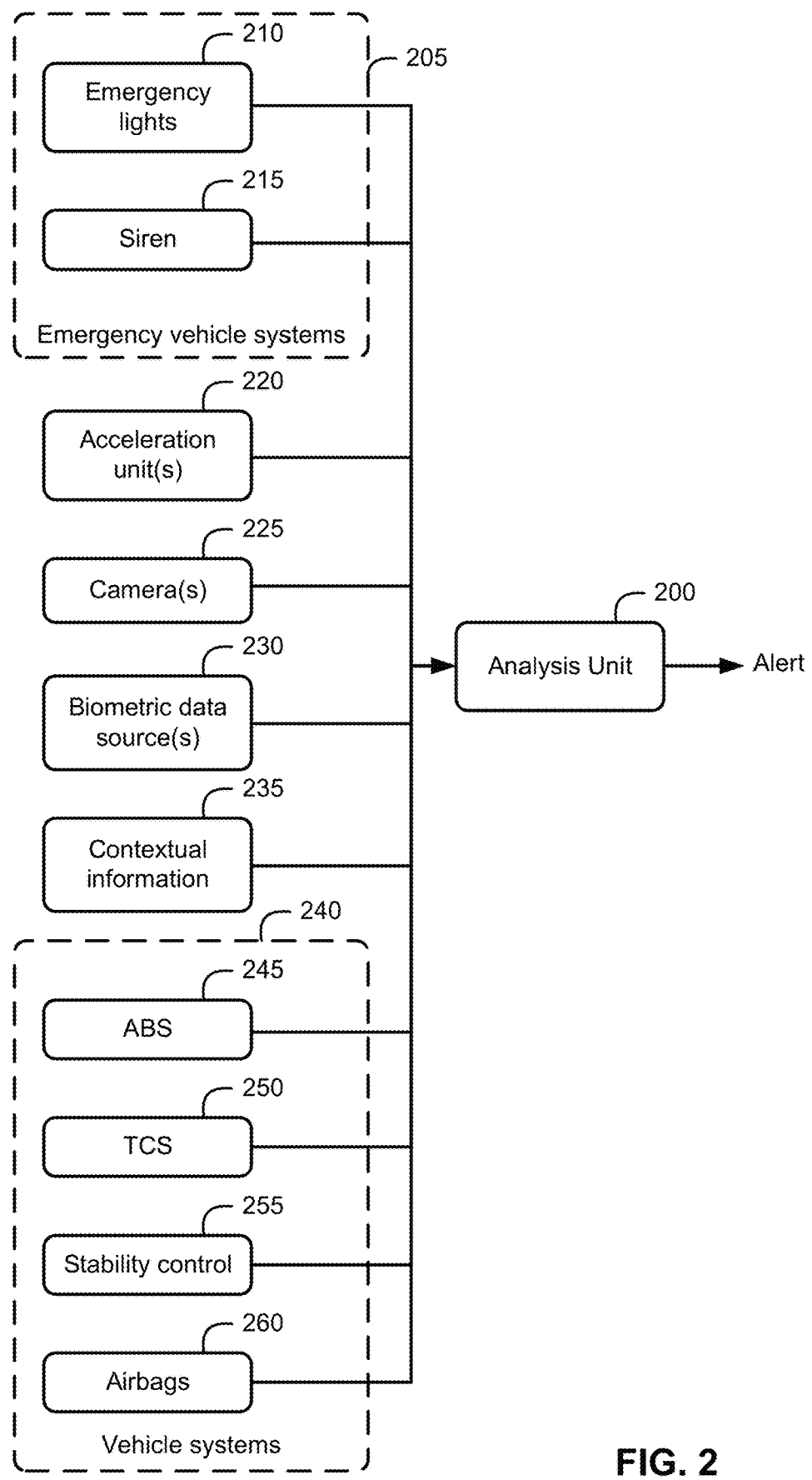
FIG. 2 is a block diagram illustrating a block diagram of information sources of an origination vehicle that may be used by an analysis unit to generate a wireless safety alert, according to an embodiment.

FIG. 2 is a block diagram illustrating a block diagram of information sources of an origination vehicle (e.g., OV 110) that may be used by an analysis unit 200 to generate a wireless safety alert, according to an embodiment. Generally put, information sources may comprise components and/or systems of the origination vehicle (or devices/systems/vehicles communicatively coupled therewith) capable of providing information regarding whether the origination vehicle is, has, and/or will be exhibiting erratic driving behavior. The analysis unit 200 may then provide an alert, which may be wirelessly communicated using a wireless communication interface of the origination vehicle. As with other figures herein, FIG. 2 is provided as a non-limiting example. Alternative embodiments may use additional and/or alternative information sources to determine whether to generate and transmit an alert.

As noted, an origination vehicle may comprise any type of vehicle, including private, commercial, and/or emergency vehicles. Emergency vehicles may include emergency vehicle systems 205 from which erratic driving behavior may be determined. As illustrated, emergency vehicle systems 205 may comprise emergency lights 210 and a siren 215. Emergency lights 210 and siren 215 are engaged, for example, in police cars when pursuing a vehicle, in fire trucks when rushing to a fire, and in ambulances when rushing to a medical emergency. Because the systems are typically activated in emergency vehicles when the emergency vehicles are engaging in erratic (non-normal) driving behavior, the status of the systems may be used by the analysis unit 200 to determine whether an wireless safety alert should be made.

The acceleration unit(s) 220 may comprise one or more systems and/or sensors within the origination vehicle that provide acceleration data (e.g., indicative of linear, angular, lateral, and/or vertical acceleration of the origination vehicle). This may comprise, for example, an inertial measurement unit (IMU), accelerometers, gyroscopes, etc., as well as information particular to vehicles, such as a throttle state, speedometer reading, etc. Lateral accelerations can be analyzed to determine whether the origination vehicle is swerving. Sudden vertical acceleration can be analyzed to determine whether the origination vehicle has had a curb or similar feature.

Information from camera(s) 225 can be helpful to the analysis unit 200 in various ways. In conjunction with a street sign detection system of the vehicle (not shown), for example, camera(s) 225 can be used to identify stop signs, speed limits, traffic lights, etc., and other data from the origination vehicle can be used by the analysis unit 200 to determine whether the origination vehicle is adhering to traffic laws. Camera(s) 225 may also capture images from which vehicle motion may be detected (e.g., via motion blur or other movement analysis), which can be used to determine erratic driving behavior. In some embodiments, camera(s) 225 may include one or more cameras inside the origination vehicle that capture eye-movement and/or physical behaviors from the driver and/or passengers. Certain types of eye-movement and/or physical behavior by the driver, for example, may be indicative of erratic driving behavior. Cameras 225 may also be capable of capturing relevant information regarding other vehicles. For an origination vehicle comprising a police vehicle (e.g., the OV 110 of FIG. 1), camera(s) 225 may include a dash camera capable of capturing images of a pursued vehicle (e.g., the PV 120). The analysis unit 200 may be capable of detecting erratic driving behavior by the pursued vehicle from the dash camera images and using it to determine whether the origination vehicle is also engaged in erratic driving behavior.

One or more biometric data sources 230 may comprise one or more devices or systems communicatively coupled with the analysis unit 200 capable of providing biometric data of the driver and/or passengers. Sensors integrated into the origination vehicle, such as into a steering wheel or seat, for example, may include an electrocardiogram (ECG) capable of measuring heart rate/rhythm. Additionally or alternatively, one or more wearable devices (e.g., wristbands, vests, etc.) may be worn by a driver to gather information regarding the driver's heart rate, blood pressure, etc. Certain types of changes to biometric data may be indicative of erratic driving behavior, and therefore may be used by the analysis unit 200.

Contextual information 235 comprise information obtained from a positioning system (e.g., using a Global Navigation Satellite System (GNSS) receiver, terrestrial RF positioning, dead reckoning, etc.) as well as map information regarding the area in which the origination vehicle is driving. This information combined may be indicative of where, on a map of a geographical region, the origination vehicle is located. In some embodiments, contextual information may also comprise whether and/or traffic information (e.g., indicative of road hazards and/or other traffic-related environmental information). This can be used by the analysis unit 200 as contextual information for processing information from other information sources. For example, contextual information 235 may indicate whether the origination vehicle is on or off a road, which may inform how the analysis unit 200 processes information from acceleration unit(s) 220. Rapid lateral and/or vertical acceleration, for example, may be expected for off-road driving, but may be indicative of erratic driving behavior if experienced on a road. Similarly, contextual information 235 may indicate boundaries and a speed limit speed limits for a road on which the origination vehicle is driving. If the analysis unit 200 determines that the origination vehicle is not within the boundaries and/or not driving the speed limit (e.g., within a threshold range of the speed limit), it may determine that the origination vehicle is experiencing erratic driving. For embodiments in which the contextual information 235 includes weather information and/or road hazard information, this may also be taken into account to determine whether particular types of driving are indicative of erratic driving behavior or simply responsive to whether/road hazards (e.g., driving slow in a snowstorm, swerving to avoid a pothole, etc.).

Additionally, the contextual information 235 may be helpful in determining where the origination vehicle may be headed, which may be included in a wireless alert and/or used when determining how to propagate the alert. For example, although a location and heading of the origination vehicle may be helpful information to receiving devices in cases in which the origination vehicle is driving along a straight street, it may not be so helpful if the street curves or turns in another direction. Contextual information 235 may be used to include a street name in the alert and/or adjust propagation policies accordingly.

Other vehicle systems 240 also may be used as information sources by the analysis unit 200 to determine whether to generate a safety alert that the origination vehicle is experiencing erratic driving. These vehicle systems 240 may include the antilock brake system (ABS) 245, the traction control system (TCS) 250, the stability control 255, and the airbags 260. The analysis unit 200 may interpret frequent engagement of ABS 245, TCS 250, and/or stability control 255 as indicative of erratic driving behavior. Airbags 260 may provide data regarding whether airbags been deployed, in which case the analysis unit 200 may interpret driving after airbags have been deployed, for example, as indicative of erratic driving behavior.

Figure 10:
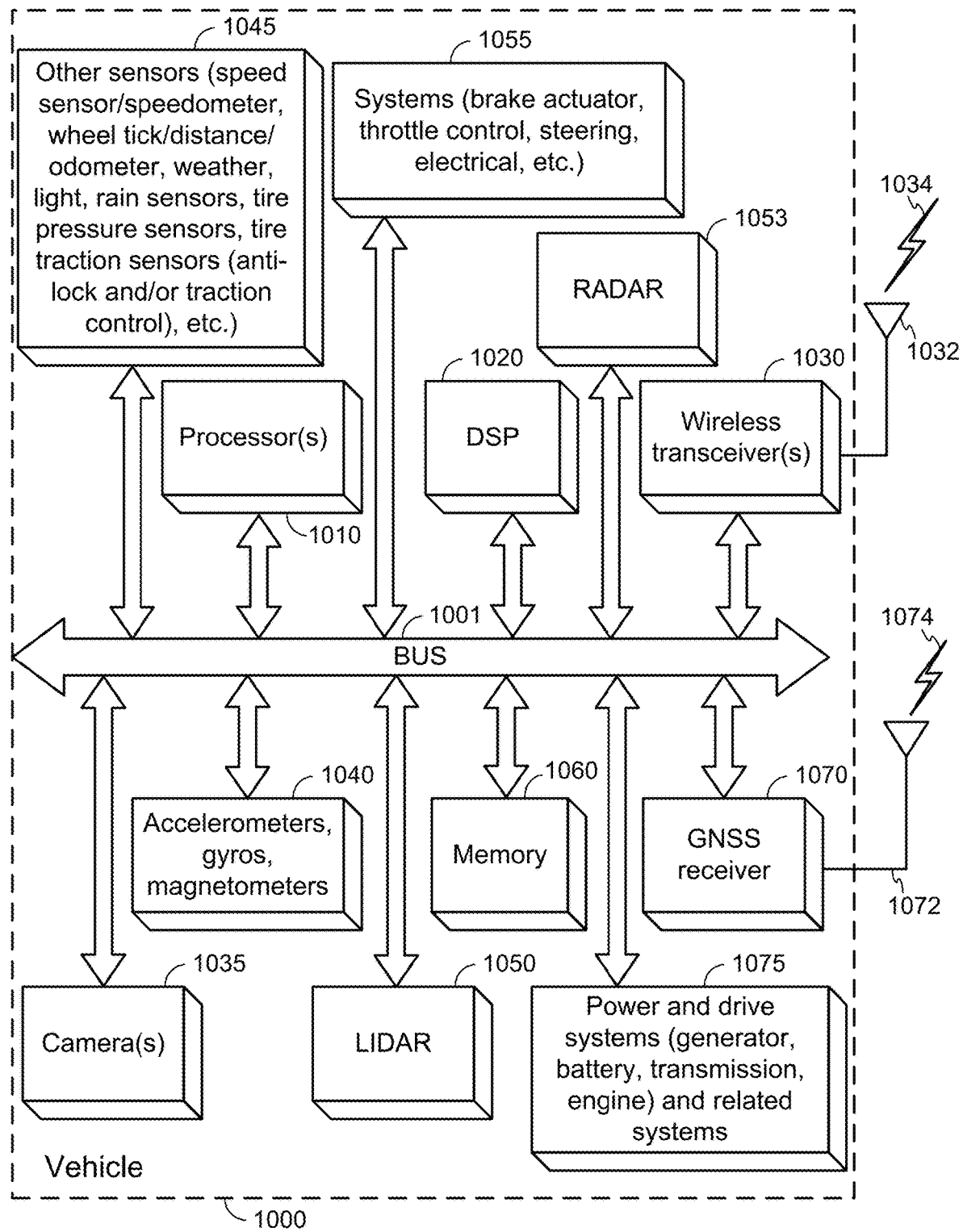
FIG. 10 is a block diagram of various hardware and software components of a vehicle, according to an embodiment.

The analysis unit 200 may comprise hardware and/or software components of a vehicle capable of processing input data from the various input information sources (e.g. items 205-260 and FIG. 2) to determine erratic driving behavior of the origination vehicle and generate safety alert. As such, analysis unit 200 may be implemented using processor(s) 1010 and/or other components of a vehicle 1000 as illustrated in FIG. 10, which is described in detail hereafter.

As noted, the analysis unit 200 may implement one or more AI/ML models to identify patterns in the input data indicative of erratic driving behavior. For example, according to some embodiments, the analysis unit 200 may implement a bidirectional long-short term memory BI-LSTM neural network to process biometric data source(s) 230 and/or input data from other information sources to determine whether the origination vehicle is exhibiting erratic driving behavior sufficient to raise an alert. (BI-LSTM are neural networks often used in medical research areas to detect human stress from sensor signals like ECG with 90% of accuracy). According to some embodiments, AI/ML models may be trained in advance with erratic driving behavior (e.g., police pursuit) datasets comprising data of the same type as provided by input information sources.

Depending on desired functionality, the output of the analysis unit 200 may vary. As indicated in FIG. 2, the analysis unit 200 may simply provide an alert when erratic driving behavior of the origination vehicle is detected. Alternatively, the analysis unit 200 may determine a level or score of erratic driving behavior and output an alert when the level or score reaches a minimum threshold. For example, the analysis unit 200 may analyze input data to determine a score of erratic behavior on a scale of 1-10, where 1 represents minimum erratic behavior and 10 represents a maximum erratic behavior, and an alert is generated if, for example, the erratic behavior ranks 4 or more on this scale. In alternative embodiments, the analysis unit 200 may determine a score based on additional and/or related factors, such as danger to other vehicles and/or pedestrians. After the analysis unit 200 determines that an alert should be sent, the vehicle may wirelessly transmit the alert to other devices.

As noted, some embodiments may leverage existing wireless communication techniques used by vehicles to propagate alert messages. Autonomous or partially autonomous cars can regularly communicate with nearby vehicles to enhance the safety, efficiency, and convenience of vehicular transportation. For example, path and maneuver planning for a V2X-capable vehicle (such as a cellular vehicle to everything-capable vehicle (CV2X)) depends on knowing the accurate inter-vehicle distances and relative locations. The capabilities and behavior of surrounding vehicles helps determine, for example, safe inter-vehicle spacing and lane change maneuvering. The location and location-related measurements are regularly communicated between vehicles, for example, through V2X application-layer standards using messages such as the Society of Automotive Engineers (SAE) J2735 Basic Safety Message (BSM), which communicate information about vehicle position, time, heading, speed, acceleration, predicted path, path history, and more. V2X-capable vehicles may execute vehicle-to-vehicle (V2V) safety applications built around BSMs. As such, according to some embodiments, a wireless alert may be included as an event flag in a BSM (e.g., in BSM part II) as a high-priority warning. Additionally or alternatively, a wireless alert may be sent as an embedded flagging in accordance with a different wireless standard and/or as a dedicated message.

The content of the safety alert message may vary, depending on desired functionality. For example, the safety alert message may include a location of the origination vehicle, a current direction of travel, one or more areas toward which the origination vehicle is approaching, a street on which the origination vehicle is located, and the like. In some embodiments, the message may further include an indication of a level of danger posed by the origination vehicle, such as its speed or level of erratic driving behavior (e.g., determined by the analysis unit 200, as described with regard to FIG. 2). According to some embodiments, information regarding the type of erratic behavior (e.g., police pursuit, ambulance/fire emergency, speeding, swerving, etc.) may be included in the safety alert message. Further, this categorization may be performed by the analysis unit 200, based on sensor and/or other input data.

Figure 3:
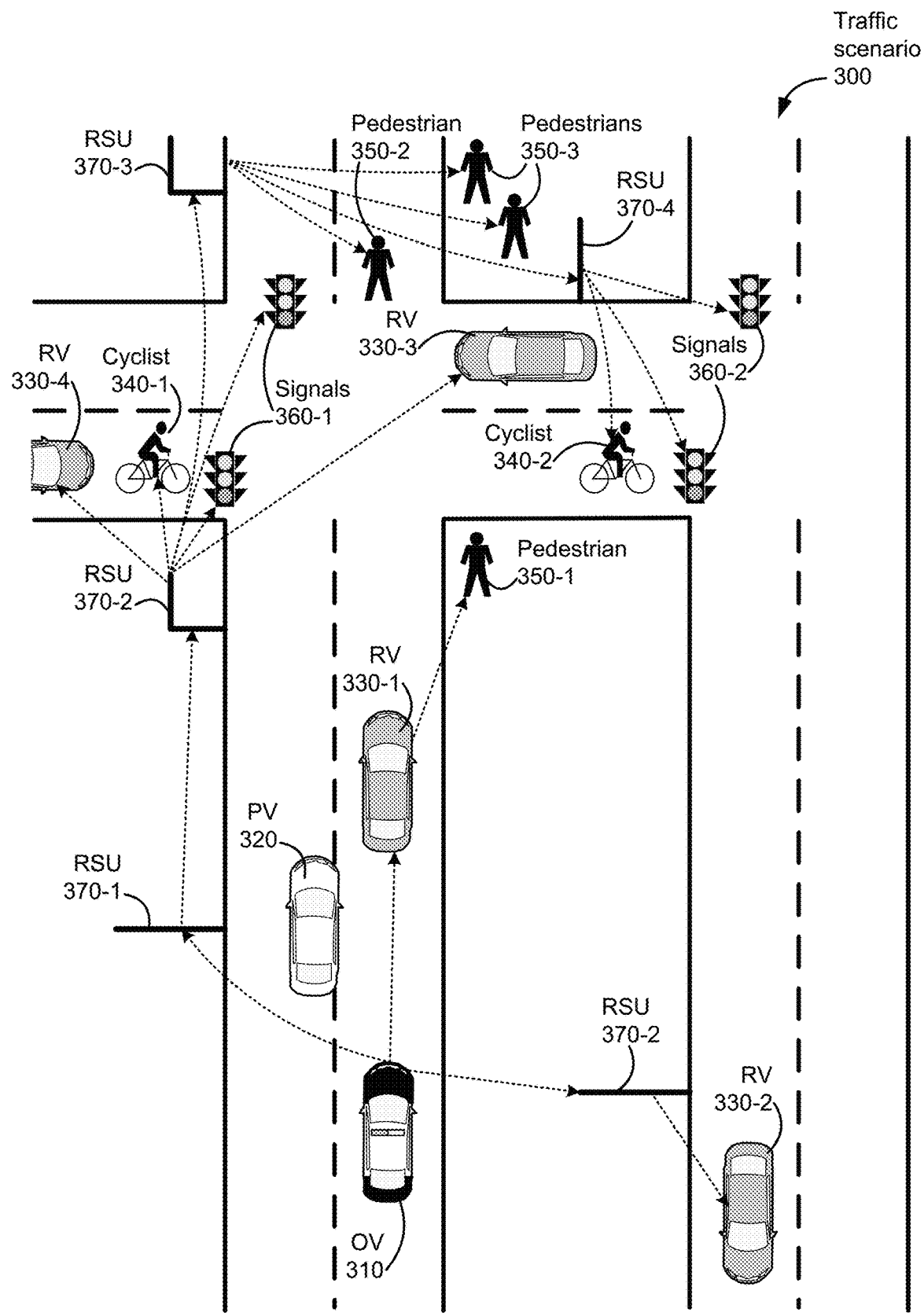
FIG. 3 is an illustration of how a wireless safety alert may be propagated in a traffic scenario, according to an embodiment.

FIG. 3 is an illustration of how a wireless safety alert may be propagated in a traffic scenario 300 similar to the traffic scenario 100 of FIG. 1, from an OV 310 to other devices. Dotted arrows indicate propagation of the alert from transmitting devices to receiving devices. Propagation can be performed via broadcast. Alternatively, propagation can be performed via unicast/group cast from a transmitting device to one or more devices with which the transmitting device is communicatively connected. Here, similar to FIG. 1, the OV 310 comprises a police car in pursuit of a pursued vehicle 320. Upon determining a police pursuit (e.g., using the previously-described techniques for analyzing data from information sources and determining to transmit a safety alert), the OV 310 broadcasts an alert message, which is received by RSU 370-1, RSU 370-2, and RV 330-1. (Other devices, such as the PV 320 may also receive the alert message.)

Depending on desired functionality, further propagation may be performed in different ways. As illustrated, devices that receive the message directly from the OV 310 (RSU 370-1, RSU 370-2, and RV 330-1) may further propagate to other devices. For example, the RV 330-1 propagates to pedestrian 350-1, RSU 370-1 propagates to RSU 370-3, and RSU-2 propagates to RV 330-2. In turn, RSU 370-2 propagates a message to cyclist 340-1, signals 360-1, RV 330-3, RV 330-4, and RSU 370-3. RSU 370-3 propagates the message to pedestrians 350-2 and 350-3, as well as RSU 370-4. Finally, RSU 370-4 propagates the message to signals 360-2 and cyclist 340-2. This example illustrates an embodiment having propagation roles in which a device, RV 330-1, receiving a message directly from the OV 310 may broadcast the safety message to nearby devices (pedestrian 350-1), while a majority of the propagation is handled by RSU's 370. Allowing devices that directly receive the message from the OV 310 to further broadcast the safety alert can help ensure that all nearby devices (e.g., the devices that may be in the most danger) receive the safety message.

Additional or alternative propagation policies may be implemented, depending on desired functionality. Different propagation policies may be implemented in different traffic areas, which may be adapted to dynamic and/or static conditions of the different traffic areas. For example, in areas in which there are many RSUs and/or in traffic conditions in which many vehicles or VRUs (e.g. pedestrians 350, cyclists 340), propagation of the alert (after the original transmission from the OV 310) may be limited to RSUs only to provide more predictable and reliable propagation and to help reduce bandwidth/channel usage. Conversely, in areas with few RSUs and/or in traffic conditions with few vehicles/VRUs, vehicles and/or VRUs may further propagate the alert. Propagation policies may also vary based on scheduled times, triggering conditions (e.g., traffic density and/or VRU exceeding a certain threshold), etc. further, propagation policies may be configured in a configuration file or policy manager of a device (e.g., RSU, vehicle, and/or VSU), and may be configured at deployment and/or via over the air (OTA) updates, for example. According to some embodiments, propagation policies may also address security concerns. Restricting propagation to RSUs, for example, may help ensure only valid alerts are propagated if RSUs are able to authenticate the alert before further propagating it.

According to some embodiments, alerts may include a number of "hops" (a number of times the alert may be re-broadcasted) which can be used to help track propagation. A receiving device may receive an alert having a certain number of hops. The receiving device may further propagate the alert after incrementing the number of hops in the alert if, pursuant to propagation policies, a threshold number of hops has not yet been met. As noted, different propagation policies may apply to different devices. For example, may propagate three times, whereas non-RSU devices may propagate once. As previously indicated, these propagation policies may vary based on traffic conditions, RSU distribution, road geometry, etc., which may be specific to a particular area. Propagation policies may further vary based on a priority (e.g., score or danger level) of the alert, where higher-priority alerts may be propagated by more devices and/or with more hops (to cover a larger propagation area).

According to some embodiments, receiving devices may perform intelligent propagation by processing contents of the alert (e.g., in addition to a number of hops) before determining whether to further propagate it. For example, the RSU 370-1 of FIG. 3 may determine that the OV 310 is headed toward the RSU 370-1 in view of the known location of the RSU 370-1 and information in the alert such as location, heading, and street. Because of this, the RSU 370-1 may propagate the alert with relatively high priority to downstream devices. Further, RSU 370-1 may set a hop number and/or hop number threshold for the alert to help ensure further propagation downstream (e.g., in the direction of the approaching OV 310). On the other hand, RSU 370-2 may determine that, in view of the OV 310 traveling on a different street and in a direction away from the RSU 370-2, the RSU 370-2 may propagate the alert with relatively low priority and/or setting a hop number/hop number threshold to help ensure limited (if any) propagation downstream. Depending on desired functionality, other devices (including moving devices such as vehicles and VRUs) may also determine whether and/or how to propagate the message in view of whether the origination vehicle is headed toward or away from them.

According to some embodiments, devices may change or add to an alert (e.g., in addition to changing a number of hops) before propagating it. As previously noted, origination vehicle (e.g., OV 310) may include the alert in a BSM. However, because RSUs are not (currently) certified to transmit BSM messages, a receiving RSU (e.g., RSU 370-1 and RSU 370-2) may send the alert using a different message type, such as a situational awareness message (e.g., SAE J2945/2). Thus, even if the original alert from the origination vehicle is sent in a BSM, further propagation of the RSUs and/or other devices may be conducted using a different message type. Additionally or alternatively, RSUs (or other receiving devices) may send "proxy BSMs" and/or distributed environmental notifications that include BSM-like information, in which an RSU may include additional sensor information regarding the alert (e.g., a detected speed of the origination vehicle from a camera and/or rate at the RSU). Additionally, as noted, a receiving device may include in the alert, an indication of whether the origination vehicle is headed toward or away from an area in which the device is located, when propagating the alert.

Different factors may affect how devices respond when receiving a safety alert (e.g., in addition to determining whether to propagate the alert). Returning again to FIG. 3, signals 360 may flash traffic lights in a certain pattern to indicate an approaching vehicle with erratic driving behavior. Different patterns may be used for different situations (e.g., a first pattern for police pursuit, a second pattern for an approaching ambulance, etc.) and/or different priorities. RSUs 370 equipped with sirens (not shown) may play an audible siren (e.g., similar to a weather alert siren) and/or voice alarm to audibly alert people in an area (that may not otherwise be alerted by personal mobile devices equipped to directly receive the alert). Remote vehicles 330 may comprise an onboard unit (OBU) or other interface with which the remote vehicles 330 may notify drivers and passengers of the alert. VRUs such as pedestrians 350 and cyclists 340 may be alerted via VRU devices such as the mobile phone and/or wearable device (e.g., equipped to communicate directly with vehicles or other V2X devices via a PC5 or similar wireless interface). Such devices may respond similar to an Amber alert, in which the devices sound an alarm and/or other notifications (vibration, display, etc.) indicating an alert. In some embodiments, VRU devices may further display relevant contents of the alert to enable human users to take appropriate precautions (e.g., location, heading, and street of the OV 310).

According to some embodiments, a receiving device may filter out and alert that is not applicable to the device. This may be done, for example, in view of the contents of the alert (e.g., an indication the origination vehicle is headed in another direction, an indication that the origination vehicle is on an overpass, freeway, or other street having barricades protecting VRUs vehicles not on the street, etc.). Such filtering may also be done based on the location, speed, heading, and/or other characteristics of a VRU. A VRU device may not respond to an alert (or may respond in a lower-priority manner), for example, if the VRU device is located within a theater or shopping mall, where the danger is much lower than outside.

Figure 4:
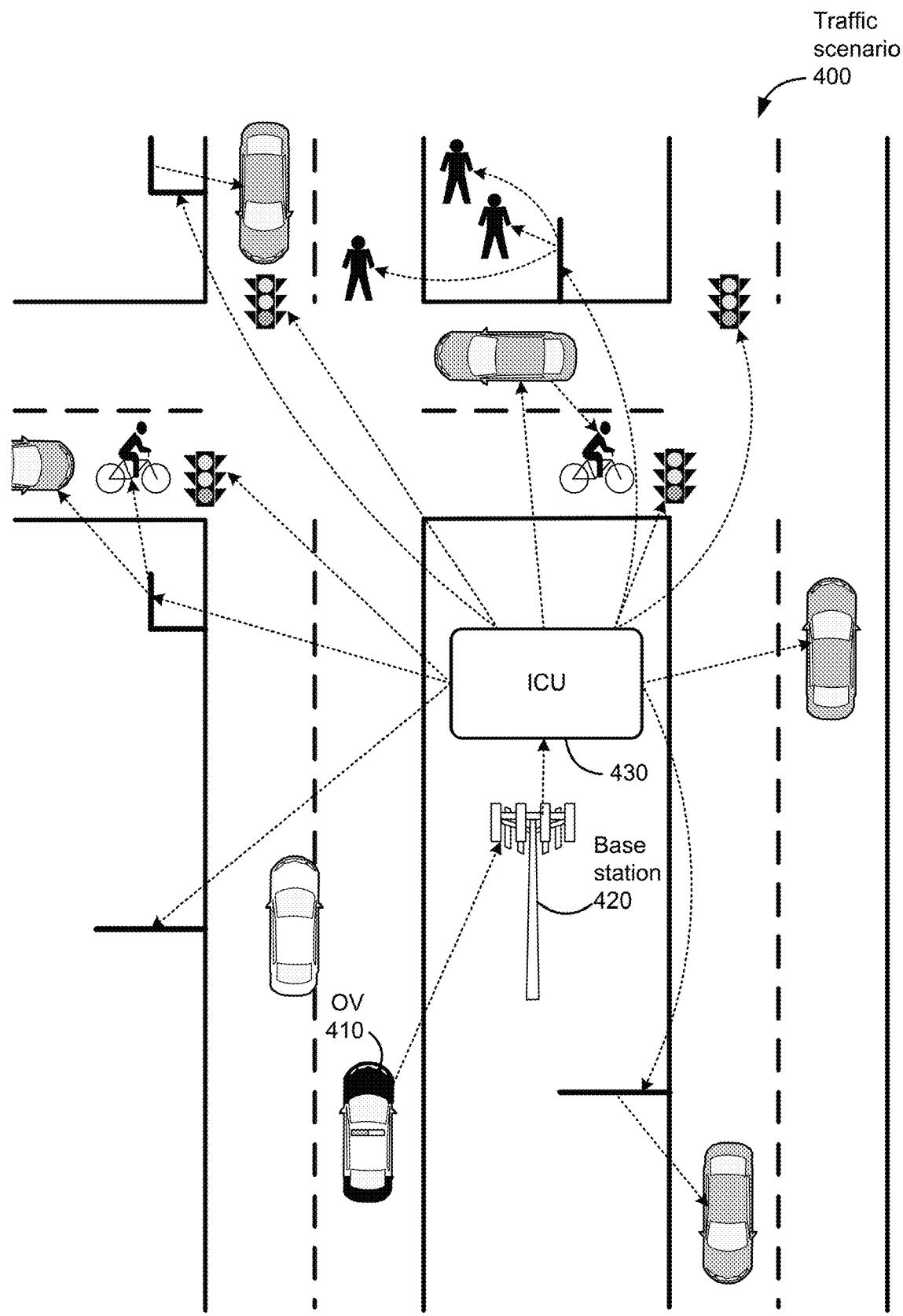
FIG. 4 is an illustration of an alternative way in which a wireless safety alert may be propagated in a traffic scenario, according to an embodiment.

FIG. 4 illustrates an alternative form of safety alert propagation involving V2N communication, which may be used in some embodiments. FIG. 4 depicts a traffic scenario 400 similar to traffic scenarios in FIGS. 1 and 3, having an OV 410 in direct communication with a cellular base station 420. The base station 420 may operate as a cellular base station for cellular communications via fourth-generation (4G) long-term evolution (LTE) and/or fifth-generation (5G) new radio (NR). Here, the OV 410 may wirelessly transmits the safety alert to the base station 420, which then provides the safety alert to an infrastructure control unit (ICU) 430 (e.g., via wired and/or wireless communication). The ICU 430, which may comprise a dedicated server running in the cloud, can then determine an affected area (e.g., area in which vehicles and/or VRUs may be subject to a degree of danger) based on information in the safety alert (e.g., heading, speed, etc.) and possible routes the OV 410 may take. The ICU 430 can then propagate the safety alert to various devices within the affected area (e.g., via the Internet for Internet-connected devices and/or via direct wired or wireless communication), as illustrated in FIG. 4. Depending on desired functionality, devices that receive the safety alert from the ICU 430 may further propagate the safety alert to other devices (e.g., as also illustrated in FIG. 4) utilizing various propagation policies as previously discussed.

Figure 5:
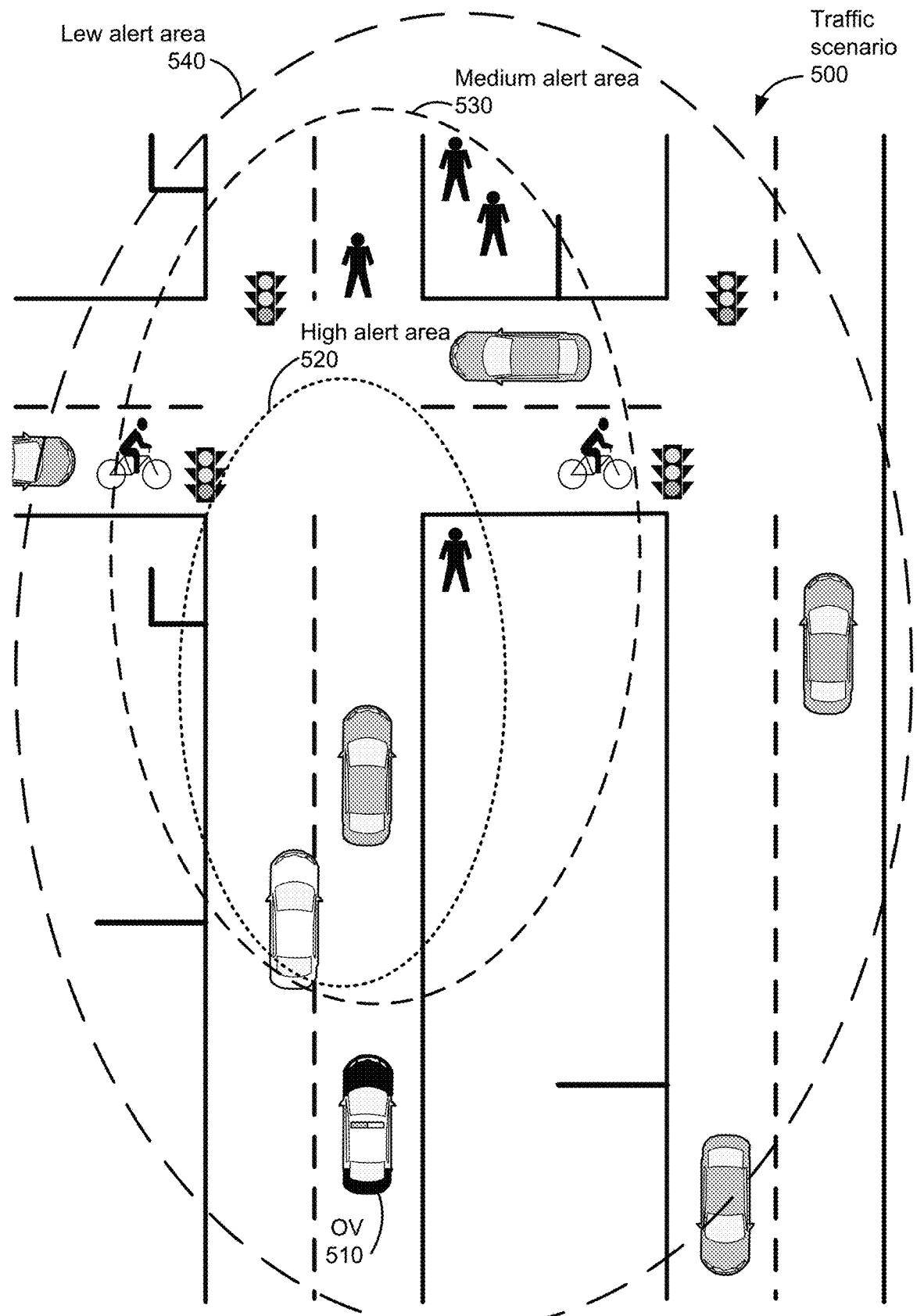
FIG. 5 is illustration another traffic scenario, depicting how different alert levels may be designated for different areas in which a safety alert is propagated, according to an embodiment.

FIG. 5 is illustration another traffic scenario 500, depicting how different alert levels may be designated for different areas in which a safety alert is propagated (e.g., using the propagation techniques previously described). That is, for a region in which a safety alert message is propagated, devices that propagate the safety alert (e.g., an ICU, RSUs, vehicles, etc.) may include an alert level when transmitting the safety alert corresponding to a degree of danger to which devices in the different areas may be subject, based on factors such as proximity to the OV 510, direction of travel by the OV 510, the probable route of the OV (as described in more detail hereafter), and/or other such factors. The transmitting devices may include alert levels in the safety alert in accordance with propagation policies to help ensure the proper alert level for a given area is included in safety alert propagated within the area. As shown in FIG. 5, a high alert area 520 may comprise an area in front of the OV 510 in which vehicles, pedestrians, etc. may be exposed to the greatest degree of danger. A medium alert area 530 may comprise an area in front of the OV 510 in which vehicles, pedestrians, etc. are exposed to less danger, and a low alert area 540 may comprise an area in vehicles, pedestrians, etc. are exposed to even less danger. Alternative embodiments may have a larger or smaller number of alert areas. Alert areas may be determined based on It should be noted that the illustration in FIG. 5 is greatly simplified. In an actual implementation, a safety alert may be propagated within several square kilometers, for example, and alert areas may be much larger than depicted in FIG. 5. According to some embodiments, alert areas may vary in shape and size, based on factors such as a degree of danger (e.g., the previously-described score provided by the analysis unit 200 of FIG. 2), a speed of the OV 510, location of devices propagating the alert, and/or other factors. For example, a relatively fast moving OV 510 and/or relatively dangerous conditions may result in relatively larger alert areas. The shape of alert areas may also vary, depending on a predicted route the OV 510 may take. That is, and ICU or other device may determine probable routes for the OV 510 (e.g., in accordance with propagation policies) and alert areas may be designated based on a probability that the OV 510 follows those routes. For example, a high alert area may be designated for likely routes, whereas a low alert area may be designated less-likely routes.

Figure 6:
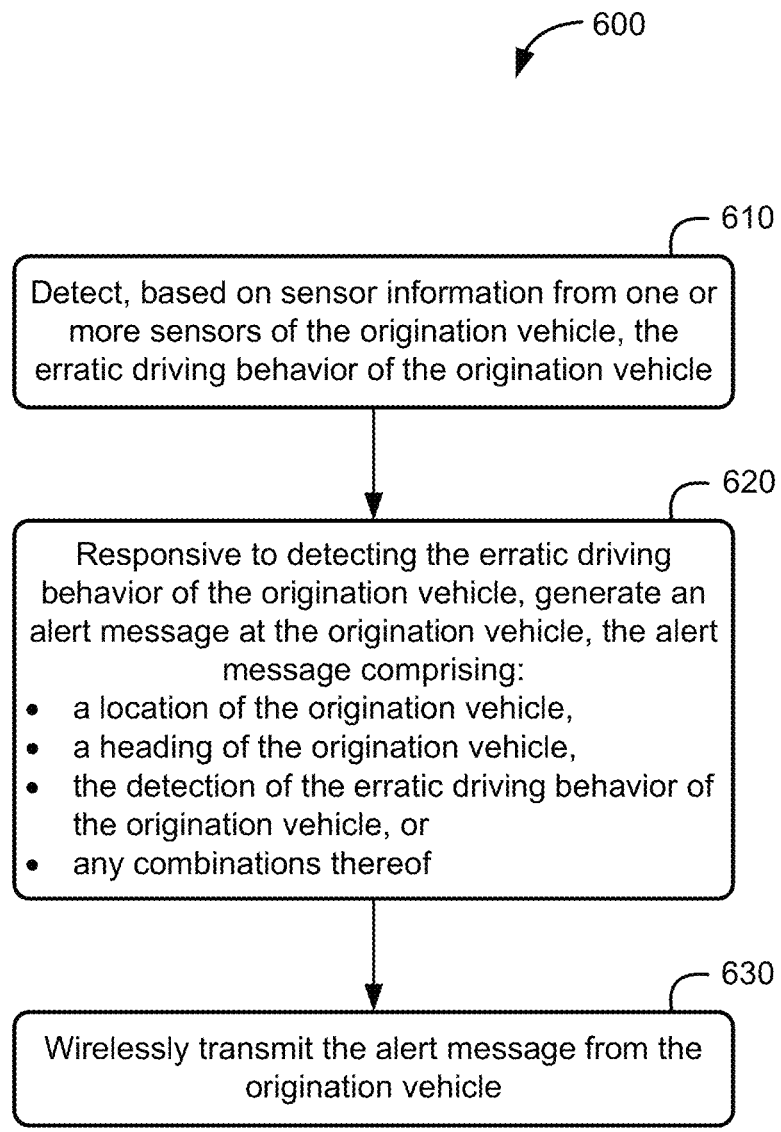
FIG. 6 is a flow diagram of a method of providing erratic driving behavior detection, according to an embodiment.

FIG. 6 is a flow diagram of a method 600 of providing erratic driving behavior detection, according to an embodiment. Some or all of the operations of the method 600 may be performed by hardware and/or software components of a vehicle (e.g., origination vehicle), such as the hardware/software components of the vehicle 1000 illustrated in FIG. 10 and described below. Furthermore, alternative embodiments may alter the functionality shown in the blocks of FIG. 6 by separating or combining blocks to perform functions in a different order, simultaneously, etc., when appropriate. A person of ordinary skill in the art will readily recognize such variations in view of the description herein.

The functionality of block 610 comprises detecting, based on sensor information from one or more sensors of the origination vehicle, the erratic driving behavior of the origination vehicle. As previously indicated in FIG. 2, a variety of information sources may be used to determine erratic driving behavior. These information sources may obtain their information using underlying sensors. In particular, according to some embodiments, sensor information may comprise information regarding origination vehicle acceleration, a status of a vehicle system of the origination vehicle, a location of the origination vehicle relative to a roadway, physical behavior a driver of the origination vehicle, or behavior of a separate vehicle, or any combinations thereof. As previously discussed, in cases where the origination vehicle comprises a police vehicle, the status of the vehicle system of the origination vehicle may comprise whether emergency lights of the origination vehicle are activated, or whether sirens of the origination vehicle are activated, or any combinations thereof. According to some embodiments, the information regarding the physical behavior of the driver of the origination vehicle may comprise detected eye motion of the driver of the origination vehicle, or electrocardiogram (ECG) signals detected from the driver of the origination vehicle, or any combinations thereof. As noted, in some instances (e.g., during a police chase) detected behavior of another vehicle (e.g., via a dash cam) may be used. As such, according to some embodiments, the information regarding the behavior of the separate vehicle may comprise a determination of erratic driving behavior of the separate vehicle from one or more cameras of the origination vehicle. As indicated in the previously-described embodiments, a machine learning algorithm may be used to process the sensor information from the one or more sensors. According to some embodiments, the machine learning algorithm may comprise a BI-LSTM neural network Means for performing the functionality at block 610 may include one or more software and/or hardware components of a vehicle, such as a bus 1001, processor(s) 1010, DSP 1020, radar 1053, camera(s) 1035, other sensors 1045, accelerometers/gyros/magnetometers 1040, lidar 1050, power and drive systems 1075, memory 1060, wireless transceiver(s) 1030, and/or other software and/or hardware components of a vehicle 1000 as illustrated in FIG. 10, which is described in more detail below.

The functionality shown by block 620 comprise, responsive to detecting the erratic driving behavior, generating an alert message at the origination vehicle, the alert message may comprise a location of the origination vehicle, a heading of the origination vehicle, the detection of the erratic driving behavior, or any combinations thereof. The heading of the origination vehicle may comprise a direction of travel of the origination vehicle and a street name According to some embodiments, the detection of the erratic driving behavior may comprise information indicative of erratic driving behavior, which may be relatively simple (e.g., the alert message may indicate the detection of an erratic driving behavior via a binary flag or numerical scale), or may comprise a more detailed description or other indication of the type or category of erratic driving behavior, such as police pursuit, speeding vehicle, swerving vehicle, etc. As noted, the alert message may comprise a BSM.

Means for performing the functionality at block 610 may include one or more software and/or hardware components of a vehicle, such as a bus 1001, processor(s) 1010, DSP 1020, and/or other software and/or hardware components of a vehicle 1000 as illustrated in FIG. 10, which is described in more detail below.

At block 630, the functionality comprises, wirelessly transmitting the alert message from the origination vehicle, which may comprise sending the alert message to an RSU, an ICU, a VRU, or a separate vehicle, or any combination thereof. Means for performing the functionality at block 630 may include one or more software and/or hardware components of a vehicle, such as a bus 1001, processor(s) 1010, memory 1060, wireless transceiver(s) 1030, and/or other software and/or hardware components of a vehicle 1000 as illustrated in FIG. 10.

Figure 7:
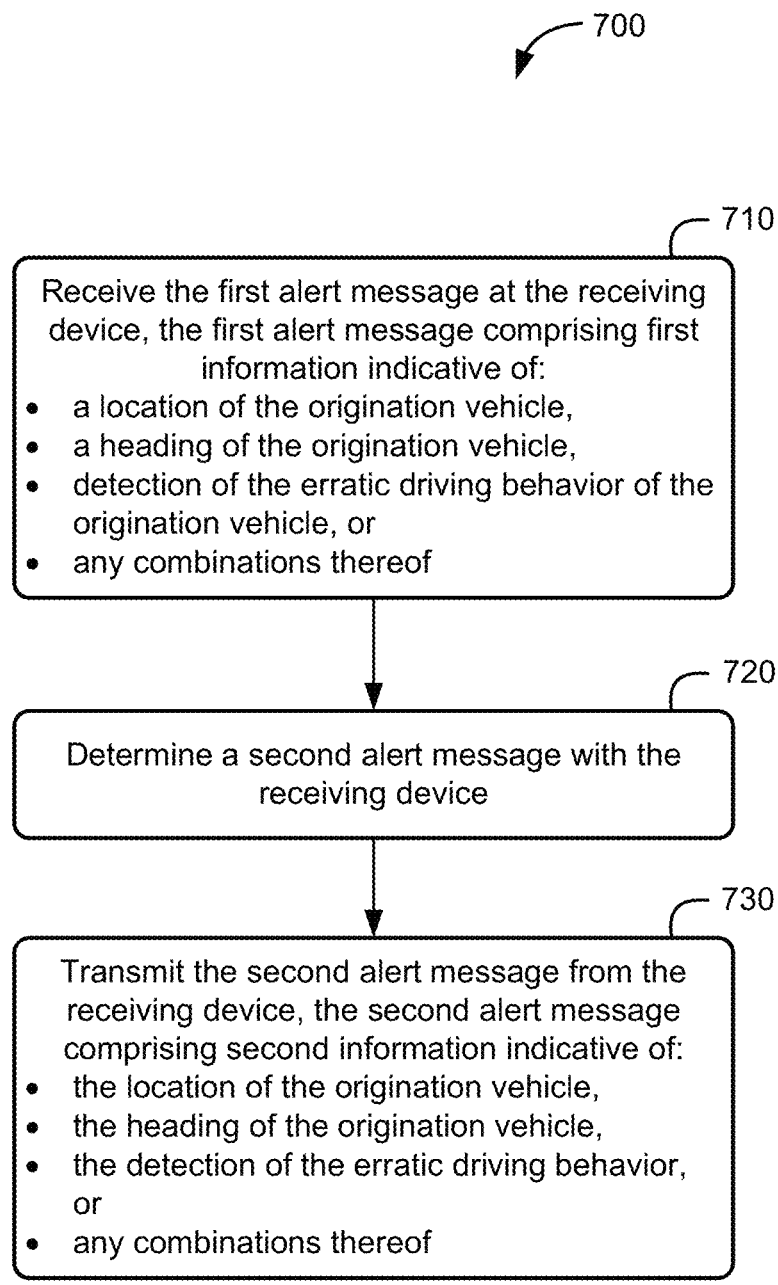
FIG. 7 is a flow diagram of a method of propagating, at receiving device, a first alert message of detected erratic driving behavior of an origination vehicle, according to an embodiment.

FIG. 7 is a flow diagram of a method 700 of propagating, at receiving device, a first alert message of detected erratic driving behavior of an origination vehicle, according to an embodiment. Means for performing some or all of the operations of the method 700 may be performed by hardware and/or software components of receiving device, which may comprise an RSU, ICU, VRU, or a receiving vehicle, for example. Example hardware and software components for these devices are described hereafter with regard to FIGS. 8-12. Furthermore, alternative embodiments may alter the functionality shown in the blocks of FIG. 7 by separating or combining blocks to perform functions in a different order, simultaneously, etc., when appropriate. A person of ordinary skill in the art will readily recognize such variations in view of the description herein.

The functionality at block 710 comprises receiving the first alert message at the receiving device, the first alert message comprising first information indicative of a location of the origination vehicle, a heading of the origination vehicle, detection of the erratic driving behavior of the origination vehicle, or any combinations thereof. As indicated in the previously-described embodiments, the origination vehicle may comprise any of a variety of types of vehicles, including a police vehicle. According to some embodiments, the first alert message may comprise a BSM. Means for performing the functionality at block 710 may comprise a wireless transmitter, processor, and memory of a receiving device, e.g., as described hereafter with regard to FIGS. 8-12.

The functionality at block 720 comprises determining a second alert message with the receiving device. The second alert message may comprise a message to be transmitted by the receiving device, and as noted, this message may take different forms. In a simple embodiment, the second alert message may comprise the first alert message. As noted, a number of hops may be included in the first alert message, in which case the receiving device may increment (e.g., in cases where the number of hops taken is included in the message) or reduce (e.g., in cases where the number of remaining hops is included in the message) the number by one. More specifically, for some embodiments of the method 700, the first alert message further may comprise a first number of hops and the second alert message comprises a second number of hops, the second number of hops comprising the first number of hops, incremented or reduced by one. Means for performing the functionality at block 710 may comprise a wireless transmitter, processor, and memory of a receiving device, e.g., as described hereafter with regard to FIGS. 8-12.

The functionality at block 730 comprises transmitting the second alert message from the receiving device, the second alert message comprising second information indicative of the location of the origination vehicle, the heading of the origination vehicle, the detection of the erratic driving behavior, or any combinations thereof. As indicated in the previously-described embodiments, the propagation by the receiving device may be governed by receiving policies, which may vary based on factors such as alert message content (speed, heading, etc.), receiving device type, schedule, traffic conditions, etc. RSUs and ICUs, for example, may take a particularly important role when propagating the alert message. For embodiments in which the receiving device comprises an RSU or an ICU, for example, the method may further comprise determining one or more recipient RSUs to which to transmit the second alert message based at least in part on the location of the origination vehicle, the heading of the origination vehicle, and for each recipient RSU of the one or more recipient RSUs, a location of the respective RSU, and transmitting the second alert message comprises sending the second alert message to the one or more recipient RSUs. In cases where the receiving device comprises a RSU the method may further comprise sounding an alarm at the RSU. As noted, and alarm may include a siren, audible voice warning, etc. According to some embodiments, determining the second alert message may be based at least in part on the location of the origination vehicle, the heading of the origination vehicle, and a location of the receiving device, and the receiving device comprises the RSU or the receiving vehicle. Some embodiments may comprise including, in the second alert message, a message priority based at least in part on a distance between the location of the receiving device and the location of the origination vehicle. As previously noted, this message priority may impact how the message is propagated (e.g., to different alert areas as described in relation to in FIG. 5) and/or how a receiving device reacts to the alert. In such instances, the receiving device may comprise a receiving vehicle or an RSU. In some embodiments, the receiving device may comprise a receiving vehicle or an RSU and transmitting the second alert message may comprise sending the second alert message to one or more VRUs, one or more additional vehicles, or any combinations thereof.

FIGS. 8-12 are illustrations of devices, components, and systems that can be used to implement the techniques provided herein for generating and propagating a vehicle-originated wireless safety alert. In the description below, the origination vehicle (OV) and remote vehicles (RVs) as used in the previously-described embodiments are referred to generically simply as "vehicles." RSUs 825 may correspond with the RSUs previously-described in relation to FIGS. 1-7. Sensors, vehicle systems, and similar components of a vehicle may correspond, for example, with information sources 210-260, as described with regard to FIG. 2.

Figure 8:
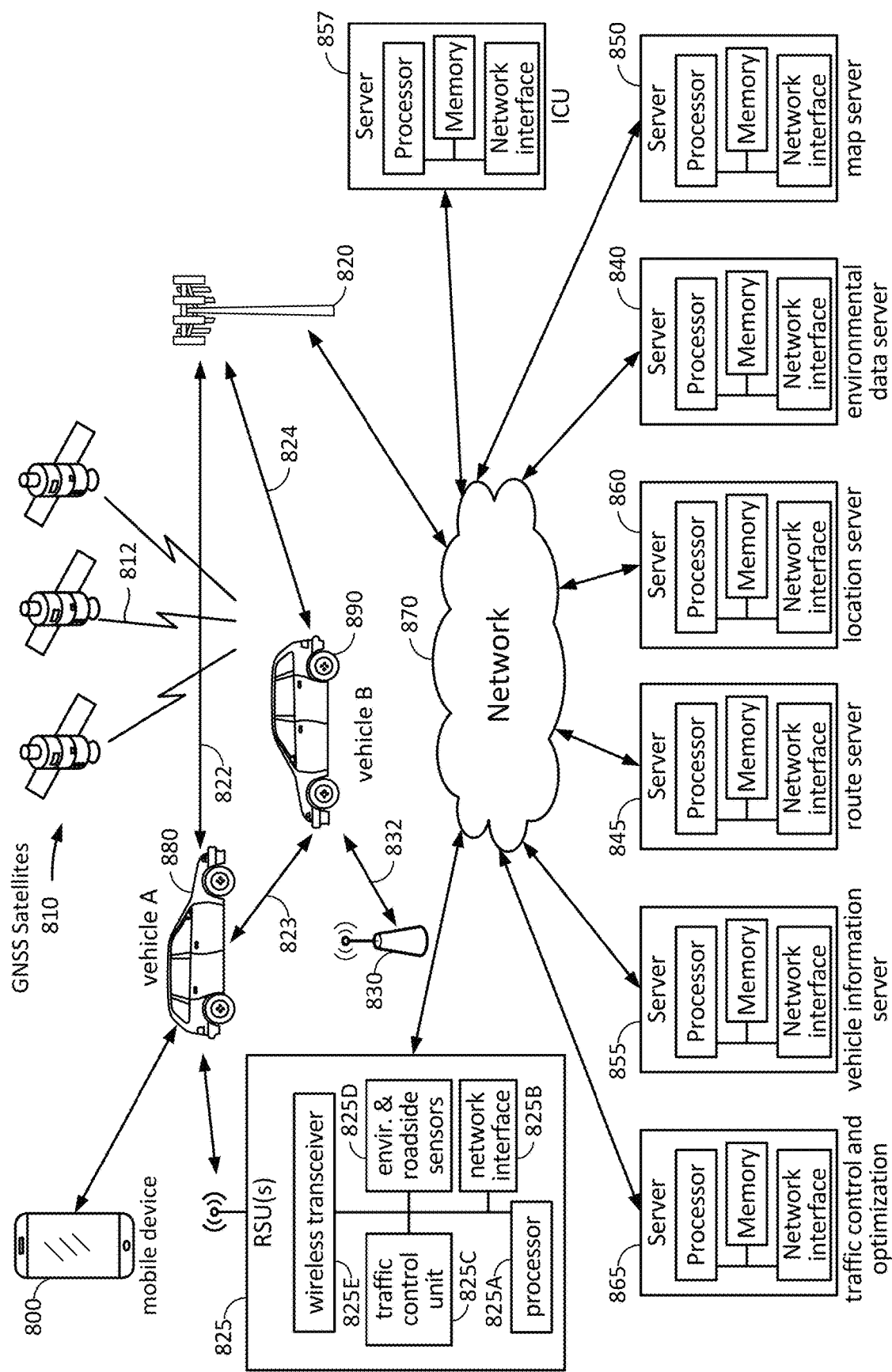
FIG. 8 is an illustration of a system in which vehicles may communicate over various networks and with various devices, vehicles, and servers, according to an embodiment.

FIG. 8 is an illustration of a system in which vehicles may communicate over various networks and with various devices, vehicles, and servers, according to an embodiment.

In an embodiment, V2X vehicle A 880 may communicate, using V2X or other wireless communication transceiver over link 823, with V2X or otherwise communication-transceiver-enabled vehicle B 890, for example, in an embodiment to perform inter-vehicle relative positioning, negotiation for lane changes or for passage through an intersection, and to exchange V2X data elements such as GNSS measurements, vehicle status, vehicle location and vehicle abilities, measurement data, and/or calculated status, and to exchange other V2X vehicle status steps that may not be covered in the V2X capability data elements. In an embodiment, vehicle A 880 may also communicate with vehicle B 890 through a network, for example, via wireless signals 822 and 824 to/from base station 820 and/or via wireless signals 832 to/from an access point 830, or via one or more communication-enabled RSU(s) 825, any of which may relay communication, information and/or convert protocols for use by other vehicles, such as vehicle B 890, particularly in an embodiment where vehicle B 890 is not capable of communicating directly with vehicle A 880 in a common protocol. In an embodiment, RSU(s) may comprise various types of roadside beacons, traffic and/or vehicular monitors, traffic control devices, and location beacons.

In an embodiment, RSU(s) 825 may have a processor 825A configured to operate wireless transceiver 825E to send and receive wireless messages, for example, BSM or Cooperative Awareness Messages (CAM) or other V2X messages to/from vehicle A 880 and/or vehicle B 890, from base station 820 and/or access point 830. For example, wireless transceiver 825E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 825 may contain one or more processors 825A communicatively coupled to wireless transceiver 825E and memory and may contain instructions and/or hardware to perform as a traffic control unit 825C and/or to provide and/or process environmental and roadside sensor information 825D or to act as a location reference for GNSS relative location between it and vehicles. In an embodiment, RSU(s) 825 may contain a network interface 825B (and/or a wireless transceiver 825E), which, in an embodiment, may communicate with external servers such as traffic optimization server 865, vehicle information server 855, and/or environmental data server 840. In an embodiment, wireless transceiver 825E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 825E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 825 over a wireless link, and claimed subject matter is not limited in this respect.

RSU(s) 825 may receive location, status, GNSS and other sensor measurements, and capability information from vehicle A 880 and/or vehicle B 890 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU(s) 825 may utilize received information, via wireless transceiver 825E, from vehicle A 880 and/or vehicle B 890, environmental and roadside sensors 825D, and network information and control messages from, for example, traffic control and optimization server 865 to coordinate and direct traffic flow and to provide environmental, vehicular, safety and announcement messages to vehicle A 880 and vehicle B 890.

Processor 825A may be configured to operate a network interface 825B, in an embodiment, which may be connected via a backhaul to network 870, and which may be used, in an embodiment, to communicate and coordinate with various centralized servers such as a centralized traffic control and optimization server 865 that monitors and optimizes the flow of traffic in an area such as within a city or a section of a city or in a region. Network interface 825B may also be utilized for remote access to RSU(s) 825 for crowd sourcing of vehicle data, maintenance of the RSU(s) 825, and/or coordination with other RSU(s) 825 or other uses. RSU(s) 825 may have a processor 825A configured to operate traffic control unit 825C which may be configured to process data received from vehicles such as vehicle A 880 and vehicle B 890 such as location data, stopping distance data, road condition data, identification data and other information related to the status and location of nearby vehicles and environment. RSU(s) 825 may have a processor 825A configured to obtain data from environmental and roadside sensors 825D, which may include temperature, weather, camera, pressure sensors, road sensors (for car detection, for example), accident detection, movement detection, speed detection and other vehicle and environmental monitoring sensors.

In an embodiment, vehicle A 880 may also communicate with mobile device 800 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 800. In an embodiment, vehicle A 880 may communicate with mobile device 800 using WAN related protocols through a WAN network, such as via WAN base station 820 or using Wi-Fi either directly peer to peer or via a Wi-Fi access point. Vehicle A 880 and/or vehicle B 890 may communicate using various communication protocols. In an embodiment, vehicle A 880 and/or vehicle B 890 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 820 or with wireless LAN access point 830 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 880 and/or vehicle B 890, in an embodiment, may contain one or more GNSS receivers such as GNSS receiver 1070 for reception of GNSS signals 812, from GNSS satellites 810, for location determination, time acquisition and time maintenance. Various GNSS systems may be supported alone or in combination, using GNSS receiver 1070 or other receiver, to receive signals from Beidou, Galileo, GLONASS, and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 825, one or more wireless LAN access point 830 or one or more base stations 820. Various GNSS signals 812 may be utilized in conjunction with car sensors to determine location, velocity, proximity to other vehicles such as between vehicle A 880 and vehicle B 890.

In an embodiment, vehicle A and/or vehicle B may access GNSS measurements and/or locations determined at least in part using GNSS as provided by mobile device 800, which, in an embodiment would also have GNSS, WAN, Wi-Fi and other communications receivers and/or transceivers. In an embodiment, vehicle A 880 and/or vehicle B 890 may access GNSS measurements (such as pseudorange measurements, Doppler measurements, and satellite IDs) and/or locations determined at least in part using GNSS as provided by mobile device 800 as a fallback in case GNSS receiver 1070 fails or provides less than a threshold level of location accuracy.

Vehicle A 880 and/or Vehicle B 890 may access various servers on the network such as vehicle information server 855, route server 845, location server 860, map server 850, environmental data server 840, and ICU 857. Although illustrated as separate physical servers in FIG. 8, the may comprise virtual servers (e.g. in the cloud), in which case the functionality of two or more of these servers may be combined onto a single physical server and/or the functionality of any one of these servers may be separated onto separate physical servers.

Vehicle information server 855, may provide information describing various vehicles such as antenna location, vehicle size and vehicle capabilities, as may be utilized in making decisions in regard to maneuvers relative to nearby cars such as whether they are capable of stopping or accelerating in time, whether they are autonomously driven, autonomous driving capable, communications capable. In an embodiment, vehicle information server 855 may also provide information in regard to vehicle size, shape, capabilities, identification, ownership, occupancy, and/or determined location point (such as, for example, the location of the GNSS receiver) and the location of the car boundaries relative to the determined location point.

Route server 845, may receive current location and destination information, and provide routing information for the vehicle, map data, alternative route data and/or traffic and street conditions data.

ICU 857 may have the functionality as indicated in the previously-described embodiments (e.g., with respect to ICU 430 of FIG. 4). That is, the ICU may be capable of receiving an alert relayed from an origination vehicle and intelligently determining a propagation area and/or devices to which the alert may be propagated.

Location server 860, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 850 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 840 may, in an embodiment, provide weather and/or road related information, traffic information, terrain information, and/or road quality & speed information and/or other pertinent environmental data.

In an embodiment, Vehicles 880 and 890 and mobile devices 800, in FIG. 8, may communication over network 870 via various network access points such as wireless LAN access point 830 or wireless WAN base station 820 over network 870. Vehicles 880 and 890 and mobile devices 800 may also, in some embodiments, communicate directly between devices, between vehicles and device to vehicle and vehicle to device using various short range communications mechanisms to communicate directly without going over network 870, such as via Bluetooth, Zigbee and 5G new radio standards.

Figure 9:
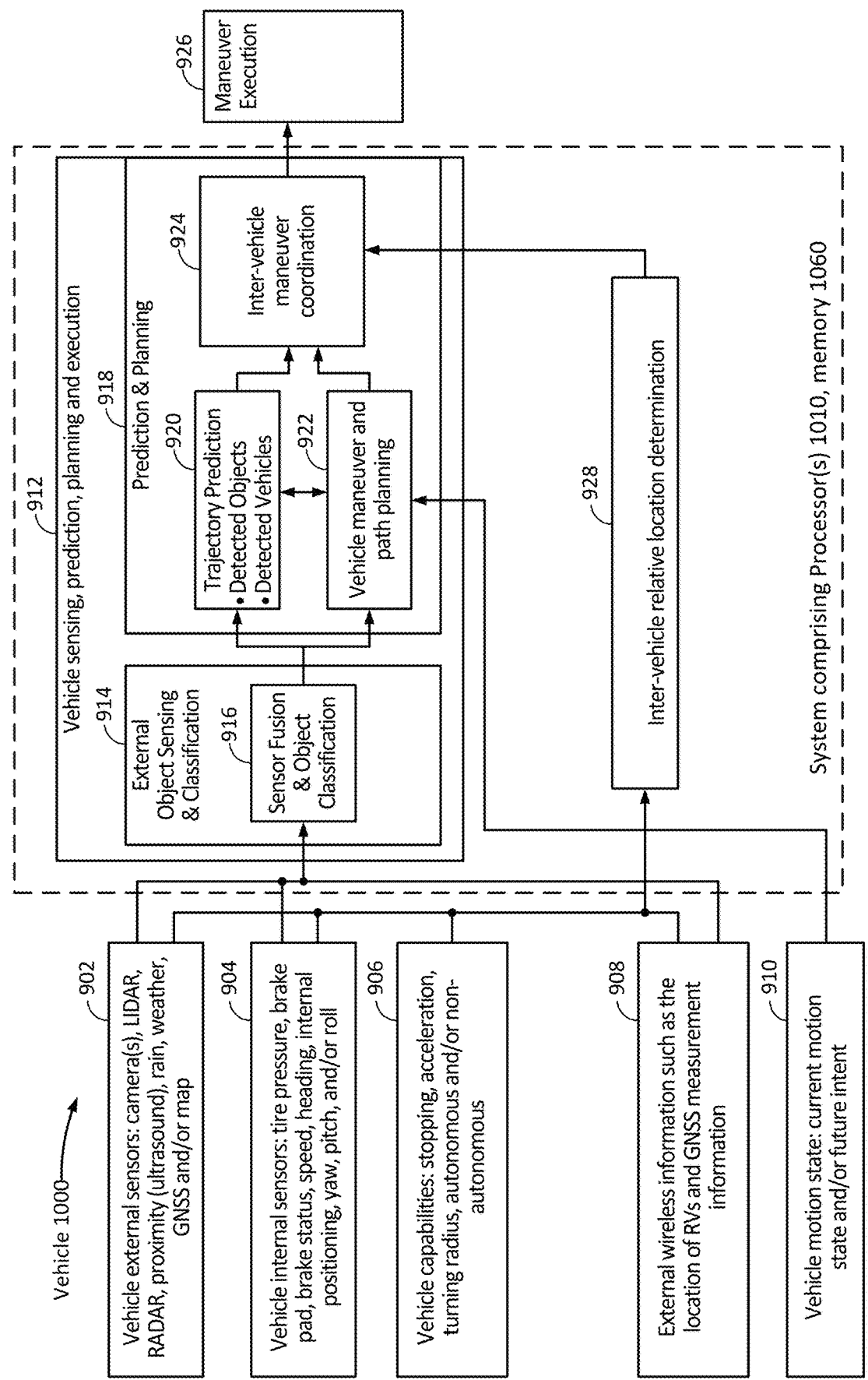
FIG. 9 comprises a functional block diagram of a vehicle, according to an embodiment.

FIG. 9 comprises a functional block diagram of a vehicle 1000, according to an embodiment. The vehicle 1000 may correspond to an origination vehicle and/or remote vehicle, as described in the embodiments above (e.g., with regard to FIGS. 1-7). Moreover, hardware and/or software components for executing the blocks shown in FIG. 9 are illustrated in FIG. 10 and described in more detail below.

As shown in FIG. 9, vehicle 1000 may receive vehicle and environment information from vehicle external sensors 902, vehicle internal sensors 904, vehicle capabilities 906, external wireless information such as the location of RVs and GNSS measurement information 908 (from the environment, from other vehicles, from RSU(s), from system servers) and/or from vehicle motion state 910 (describing current and/or future motion states). The received vehicle, sensor, and environment information may, in an embodiment, be processed in one or more processor(s) 1010, DSP(s) 1020 and memory 1060 (shown in FIG. 10), connected and configured to provide external object sensing and classification, prediction and planning, and maneuver execution, as well as to determine and update V2X or other wireless data element values, including GNSS data element values, and to transmit, via one or more wireless transceivers 1030, messaging including the determined data elements. The messaging and data elements may be sent and received via various means, protocols, and standards, such as via SAE or European Telecommunications Standards Institute (ETSI) CV2X messages and data elements or other wireless and wireless V2X protocols supported by wireless transceiver(s) 1030.

Inter-vehicle relative location determination block 928 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 1000 to determine an approximate relative location and/or an approximate range between vehicles.

In an embodiment, other vehicle-related input sources, such as servers 855, 845, 860, 850, and 840, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 924 to determine maneuver execution 926. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 850 may be utilized in conjunction with relative and/or absolute data from neighboring vehicles and/or from RSU(s) 825 to determine high confidence absolute location for a plurality of vehicles and relative location with respect to the road/map. For example, if vehicle A 880 has high accuracy/high confidence location than other vehicles in communication with vehicle A 880, such as vehicle B 890 may use GNSS information for a highly accurate relative location and the highly accurate location from vehicle A 880 sent to vehicle B 890 to determine a highly accurate location for vehicle B 890, even if the systems of vehicle B 890 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 850 is accurate, the ability to propagate highly accurate location data from vehicle A 880 to surrounding vehicles such as vehicle B 890 enables the surrounding vehicles to also determine their relative location accurately versus the map data, even in otherwise troublesome signal/location environments. Vehicle information server 855 may provide vehicle information such as size, shape, and antenna location which may be utilized, for example, by vehicle A or other vehicles to determine not just the relative location between the GNSS receiver on vehicle A 880 and, for example, vehicle B 890, but also the distance between the closest points of Vehicle A 880 and Vehicle B 890. In an embodiment, traffic information from the traffic control and optimization server 865 may be utilized to determine overall path selection and rerouting, used in conjunction with route server 845 (in an embodiment). In an embodiment, environmental data server 840 may provide input on road conditions, black ice, snow, water on the road and other environmental conditions which may also impact the decisions and decision criteria in inter-vehicle maneuver coordination block 924 and maneuver execution block 926. For example, in icy or rainy conditions, the vehicle 1000 may execute and/or request increased inter-vehicle distance from adjacent vehicles or may choose route options that avoid road hazard conditions such as black ice and standing water.

Block 928 may be implemented using various dedicated or generalized hardware and software, such as using processor 1010 and/or DSP 1020 and memory 1060 (again, as shown in FIG. 10) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SONAR, and camera measurements. In an embodiment, some or all of blocks 902, 904, 906, 908 and/or 910 may have dedicated processing cores, for example, to improve performance and reduce measurement latency. In an embodiment, some or all of blocks 902, 904, 906, 908 and/or 910 may share processing with block 928.

Vehicle external sensors 902 may comprise, in some embodiments, cameras, LIDAR, RADAR, proximity sensors, rain sensors, weather sensors, GNSS receivers 1070 and received data used with the sensors such as map data, environmental data, location, route and/or other vehicle information such as may be received from other vehicles, devices and servers such as, in an embodiment, map server 850, route server 845, vehicle information server 855, environmental data server 840, location server 860, and/or from associated devices such as mobile device 800, which may be present in or near to the vehicle such as vehicle A 880. For example, in an embodiment, mobile device 800 may provide an additional source of GNSS measurements, may provide an additional source of motion sensor measurements, or may provide network access as a communication portal to a WAN, Wi-Fi or other network, and as a gateway to various information servers such as servers 840, 845, 850, 855, 860, and/or 865.

Figure 11:
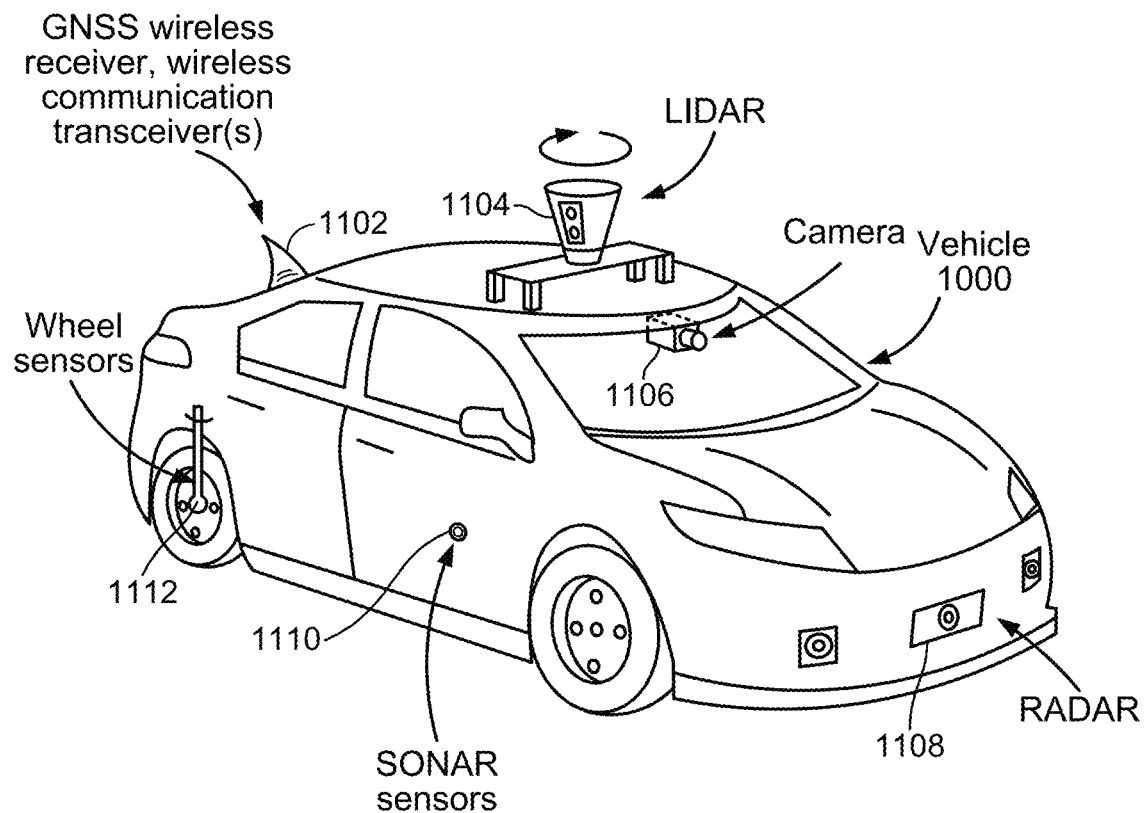
FIG. 11 is a perspective view of an example vehicle, according to an embodiment.

It is understood that the vehicle 1000 may contain one or a plurality of cameras. In an embodiment, a camera may be front facing, side facing, rear facing or adjustable in view (such as a rotatable camera). As shown in FIG. 11, for example, there may be multiple cameras 1106 facing the same plane. For example, the cameras 1106 and bumper-mounted camera at 1108 may comprise two front facing cameras, one focused on lower objects and/or a lower point of view (such as bumper mounted) for parking purposes and one focusing on a higher point of view such as to track traffic, other vehicles, pedestrians, and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1104 may be roof mounted and rotating or may be focused on a particular point of view (such as front facing, rear facing, side facing). LIDAR 1104 may be solid state or mechanical. Proximity sensors may be ultrasonic, RADAR-based, light-based (such as based on infrared range finding), and/or capacitive (surface touch oriented or capacitive detection of metallic bodies). Rain and weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 904 may comprise wheel sensors 1112 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 904 and vehicle external sensors 902 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 928 to determine vehicle location. The car status values derived from measurements from internal and external sensors may be further combined with car status values and/or measurements from other sensor systems using a general or applications processor. For example, blocks 928 and/or 924 or may be implemented on a dedicated or a centralized processor to determine data element values for V2X messaging which may be sent utilizing wireless transceivers 1030 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related, or other communication standards, such as those supported by wireless transceiver(s) 1030 and antenna(s) 1032.

In an embodiment, vehicle capabilities 906 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 908, over a wireless network from vehicular data servers on the network. This is particularly helpful to obtain information for vehicles that are not wireless capable and cannot provide vehicular information directly. In an embodiment, vehicle capabilities 906 may also be influenced by car component status such as tire wear, tire brand capabilities, brake pad wear, brake brand and capabilities, and engine status. In an embodiment, vehicle capabilities 906 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate, or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 902 and/or vehicle internal sensors 904, may be weighted more heavily and/or given preference in determining capability.

V2X vehicle sensing, prediction, planning execution 912 handles the receipt and processing of information from blocks 902, 904, 906, 908 and 910, via external object sensing and classification block 914, in part utilizing sensor fusion and object classification block 916 to correlate, corroborate and/or combine data from input blocks 902, 904, 906, 908 and 910. Block 914 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 914 may utilize GNSS measurement messages from other vehicles to determine the relative positioning to other vehicles. This output from block 914 may be provided to prediction and planning block 918, which determines detected objects and vehicles and their associated trajectory via block 920 and determines vehicle maneuver and path planning in block 922, the outputs of which are utilized in block 926 vehicle maneuver execution either directly or via V2X inter-vehicle negotiation block 924, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 10 is a block diagram of various hardware and software components of a vehicle 1000, according to an embodiment. Again, the vehicle 1000 may correspond with the origination and/or remote vehicles described in the embodiments above. Further, the vehicle may comprise for example, a car, truck, motorcycle and/or other motorized vehicle, may transmit radio signals to, and receive radio signals from, other vehicles 1000, for example, via V2X car to car communication (for example, using one of the CV2X vehicle to vehicle communication protocols), and/or from a wireless communication network 870, in an embodiment, via WAN, base station 820, and/or wireless access point 830, and/or from RSU(s) 825. In one example, vehicle 1000 (e.g., vehicle 880) may communicate, via wireless transceiver(s) 1030 and wireless antenna(s) 1032 with other vehicles (e.g., vehicle 890) and/or wireless communication networks by transmitting wireless signals to or receiving wireless signals from a remote wireless transceiver which may comprise another vehicle 890, a base station 820 (e.g., a NodeB, eNodeB, or gNodeB) or wireless access point 830, over a wireless communication link.

Similarly, vehicle 1000 may transmit wireless signals to, or receive wireless signals from a local transceiver over a wireless communication link, for example, by using a WLAN and/or a PAN wireless transceiver, here represented by one of wireless transceiver(s) 1030 and wireless antenna(s) 1032. In an embodiment, wireless transceiver(s) 1030 may comprise various combinations of WAN, WLAN, and/or PAN transceivers. In an embodiment, wireless transceiver(s) 1030 may also comprise a Bluetooth transceiver, a ZigBee transceiver, or other PAN transceiver. In an embodiment, vehicle 1000 may transmit wireless signals to, or receive wireless signals from a wireless transceiver 1030 on a vehicle 1000 over wireless communication link 1034. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a wireless local area network (WLAN, e.g., IEEE 802.11 network), a wireless personal area network (PAN, e.g., Bluetooth network) or a cellular network (e.g., an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver(s) 1030 may be located on various types of vehicles 1000, such as boats, ferries, cars, buses, drones, and various transport vehicles. In an embodiment, the vehicle 1000 may be utilized for passenger transport, package transport or other purposes. In an embodiment, GNSS signals 1074 from GNSS Satellites are utilized by vehicle 1000 for location determination and/or for the determination of GNSS signal parameters and demodulated data. In an embodiment, signals 1034 from WAN transceiver(s), WLAN and/or PAN local transceivers are used for location determination, alone or in combination with GNSS signals 1074.

Examples of network technologies that may support wireless transceivers 1030 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the 3rd Generation Partnership Project II (3GPP2). WCDMA is also part of the Universal Mobile Telecommunications System (UMTS) and may be supported by an HNB.

Wireless transceivers 1030 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, vehicle 1000 may contain one or more cameras 1035. In an embodiment, the camera may comprise a camera sensor and mounting assembly. Different mounting assemblies may be used for different cameras on vehicle 1000. For example, front facing cameras may be mounted in the front bumper, in the stem of the rear-view mirror assembly or in other front facing areas of the vehicle 1000. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

Accelerometers, gyros, and magnetometers 1040, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as potholes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 1045 such as speed sensors, wheel tick sensors, and/or odometer measurements.

LIDAR 1050 uses pulsed laser light to measure ranges to objects. While cameras may be used for object detection, LIDAR 1050 provides a means, to detect the distances (and orientations) of the objects with more certainty, especially in regard to objects of unknown size and shape. LIDAR 1050 measurements may also be used to estimate rate of travel, vector directions, relative position and stopping distance by providing accurate distance measurements and delta distance measurements.

Memory 1060 may be utilized with processor 1010 and/or DSP 1020, which may comprise Random Access Memory (RAM), Read-Only Memory (ROM), disc drive, FLASH, or other memory devices or various combinations thereof. In an embodiment, memory 1060 may contain instructions to implement various methods described throughout this description including, for example, processes to implement the use of relative positioning between vehicles and between vehicles and external reference objects such as roadside units. In an embodiment, memory may contain instructions for operating and calibrating sensors, and for receiving map, weather, vehicular (both vehicle 1000 and surrounding vehicles) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 1075 and systems (brake, actuator, throttle control, steering, and electrical) 1055 may be controlled by the processor(s) and/or hardware or software or by an operator of the vehicle or by some combination thereof. The systems (brake, actuator, throttle control, steering, electrical, etc.) 1055 and power and drive or other systems 1075 may be utilized in conjunction with performance parameters and operational parameters, to enable autonomously (and manually, relative to alerts and emergency overrides/braking/stopping) driving and operating a vehicle 1000 safely and accurately, such as to merge safely, effectively, and efficiently into traffic. In an embodiment, input from the various sensor systems such as camera 1035, accelerometers, gyros, and magnetometers 1040, LIDAR 1050, GNSS receiver 1070, RADAR 1053, input, messaging and/or measurements from wireless transceiver(s) 1030 and/or other sensors 1045 or various combinations thereof, may be utilized by processor 1010 and/or DSP 1020 or other processing systems to control power and drive systems 1075 and systems (brake actuator, throttle control, steering, electrical, etc.) 1055.

A global navigation satellite system (GNSS) receiver 1070 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 1070, may receive RF signals 1074 from GNSS satellites (e.g., GNSS signals 812 from GNSS satellites 810) using one or more antennas 1072 (which, depending on functional requirements, may be the same as antennas 1032). The GNSS receiver 1070 may support one or more GNSS constellations as well as other satellite-based navigation systems. For example, in an embodiment, GNSS receiver 1070 may support global navigation satellite systems such as GPS, the GLONASS, Galileo, and/or BeiDou, or any combination thereof. In an embodiment, GNSS receiver 1070 may support regional navigation satellite systems such as NavIC or QZSS or any combinations thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver(s) 1030 and antenna(s) 1032 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 1070 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR, and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from RSUs, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 1053, uses transmitted radio waves that are reflected off of objects. The reflected radio waves are analyzed, based on the time taken for reflections to arrive and other signal characteristics of the reflected waves to determine the location of nearby objects. RADAR 1053 may be utilized to detect the location of nearby cars, roadside objects (signs, other vehicles, pedestrians, etc.) and will generally enable detection of objects even if there is obscuring weather such as snow, rail, or hail. Thus, RADAR 1053 may be used to complement LIDAR 1050 systems and camera 1035 systems in providing ranging information to other objects by providing ranging and distance measurements and information when visual-based systems typically fail. Furthermore, RADAR 1053 may be utilized to calibrate and/or sanity check other systems such as LIDAR 1050 and camera 1035. Ranging measurements from RADAR 1053 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

FIG. 11 is a perspective view of an example vehicle 1000, according to an embodiment. Here, some of the components discussed with regard to FIG. 10 and earlier embodiments are shown. As illustrated and previously discussed, the vehicle 1000 can have camera(s) such as rear view mirror-mounted camera 1106, front fender-mounted camera (not shown), side mirror-mounted camera (not shown) and a rear camera (not shown, but typically on the trunk, hatch, or rear bumper). Vehicle 1000 may also have LIDAR 1104, for detecting objects and measuring distances to those objects; LIDAR 1104 is often roof-mounted, however, if there are multiple LIDAR units 1104, they may be oriented around the front, rear, and sides of the vehicle. Vehicle 1000 may have other various location-related systems such as a GNSS receiver 1070 (typically located in the shark fin unit on the rear of the roof, as indicated), various wireless transceivers (such as WAN, WLAN, V2X; typically, but not necessarily, located in the shark fin) 1102, RADAR 1108 (typically in the front bumper), and SONAR 1110 (typically located on both sides of the vehicle, if present). Various wheel 1112 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 11 is intended to provide exemplary locations of various sensors in an embodiment of vehicle 1000.

Figure 12:
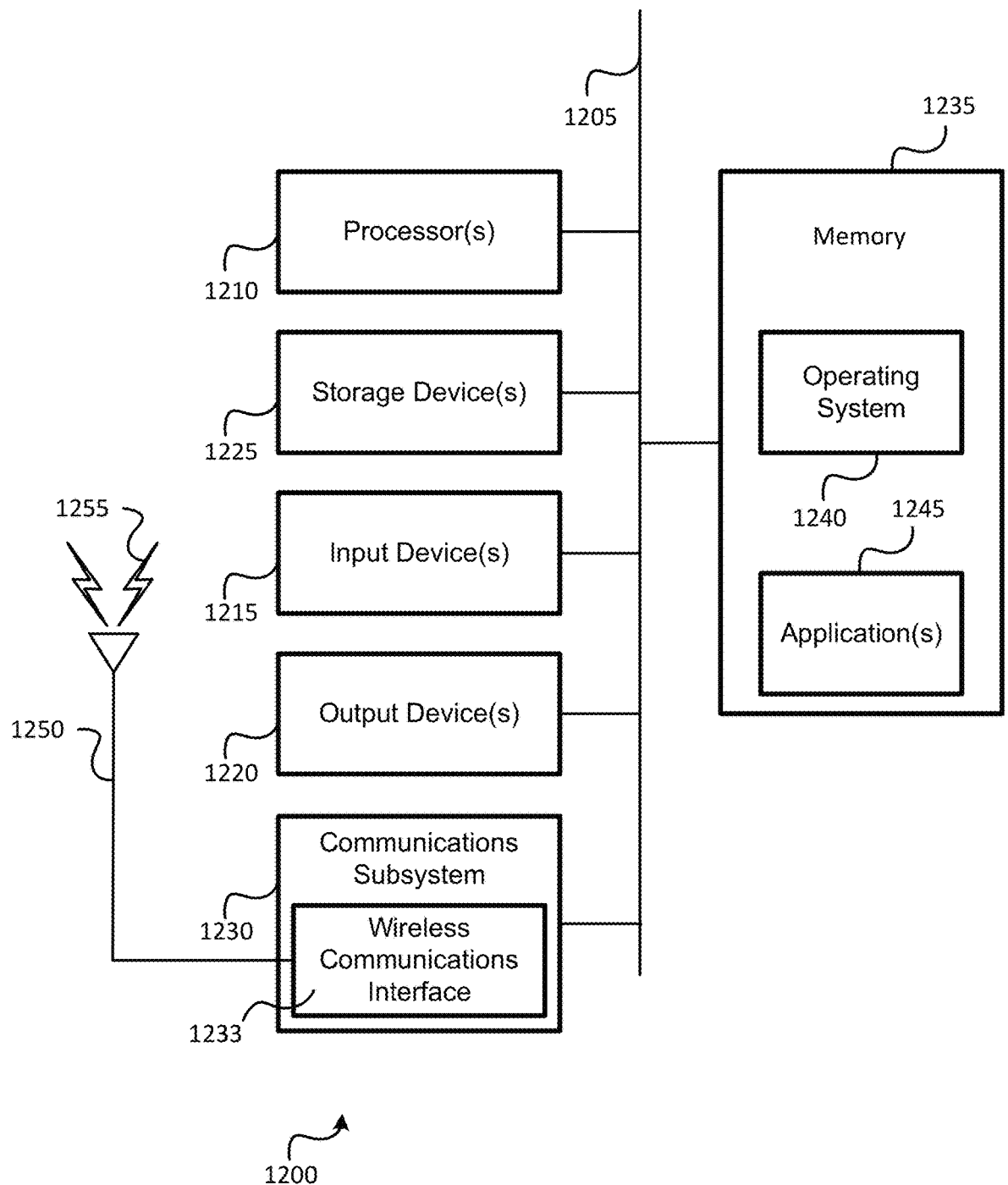
FIG. 12 is a block diagram of a computing device, according to an embodiment.

FIG. 12 is a block diagram of an embodiment of a computer system 1200, which may be used, in whole or in part, to provide computing-related functionality such as analyzing/processing data, sending and receiving electrical/ RF signals, and the like. the computing system 1200 may therefore be incorporated, in whole or in part, into devices described herein such as vehicles (e.g., OBUs), RSUs, VRU devices (e.g., mobile phones, wearable devices, etc.), signals and/or signal control units, servers (e.g., ICU), and the like. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processor(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of providing erratic driving behavior detection and alerting at an origination vehicle, the method comprising: detecting, based on sensor information from one or more sensors of the origination vehicle, erratic driving behavior of the origination vehicle; responsive to detecting the erratic driving behavior of the origination vehicle, generating an alert message at the origination vehicle, the alert message comprising: a location of the origination vehicle, a heading of the origination vehicle, or the detection of the erratic driving behavior of the origination vehicle, or any combinations thereof; and wirelessly transmitting the alert message from the origination vehicle.

Clause 2. The method of clause 1, wherein the sensor information comprises information regarding: origination vehicle acceleration, a status of a vehicle system of the origination vehicle, a location of the origination vehicle relative to a roadway, physical behavior a driver of the origination vehicle, or behavior of a separate vehicle, or any combinations thereof.

Clause 3. The method of clause 2 wherein origination vehicle comprises a police vehicle and the status of the vehicle system of the origination vehicle comprises: whether emergency lights of the origination vehicle are activated, or whether sirens of the origination vehicle are activated, or any combinations thereof.

Clause 4. The method of any of clauses 2-3 wherein the information regarding the physical behavior of the driver of the origination vehicle comprises: detected eye motion of the driver of the origination vehicle, or electrocardiogram (ECG) signals detected from the driver of the origination vehicle, or any combinations thereof.

Clause 5. The method of any of clauses 2-4 wherein the information regarding the behavior of the separate vehicle comprises a determination of erratic driving behavior of the separate vehicle from one or more cameras of the origination vehicle.

Clause 6. The method of any of clauses 1-5 wherein the alert message comprises a basic safety message (BSM).

Clause 7. The method of any of clauses 1-6 wherein the alert message indicates detection of the erratic driving behavior of the origination vehicle with a binary flag or a numerical scale.

Clause 8. The method of any of clauses 1-7 wherein the heading of the origination vehicle comprises a direction of travel of the origination vehicle and a street name.

Clause 9. The method of any of clauses 1-8 further comprising using a machine learning algorithm to process the sensor information from the one or more sensors of the origination vehicle.

Clause 10. The method of clause 9 wherein the machine learning algorithm comprises a bi-directional long short term memory (BI-LSTM) neural network.

Clause 11. The method of any of clauses 1-10 wherein wirelessly transmitting the alert message from the origination vehicle comprises sending the alert message to: a roadside unit (RSU), an infrastructure control unit (ICU), a vulnerable Road user (VRU), or a separate vehicle, or any combination thereof.

Clause 12. A method of propagating, at a receiving device, a first alert message of detected erratic driving behavior of an origination vehicle, the method comprising: receiving the first alert message at the receiving device, the first alert message comprising first information indicative of: a location of the origination vehicle, a heading of the origination vehicle, and detection of the erratic driving behavior of the origination vehicle; determining a second alert message with the receiving device; and transmitting the second alert message from the receiving device, the second alert message comprising second information indicative of: the location of the origination vehicle, the heading of the origination vehicle, or the detection of the erratic driving behavior of the origination vehicle, or any combinations thereof.

Clause 13. The method of clause 12, wherein the second alert message comprises the first alert message.

Clause 14. The method of clause 13 wherein the first alert message further comprises a first number of hops and the second alert message comprises a second number of hops, the second number of hops comprising the first number of hops, incremented or reduced by one.

Clause 15. The method of any of clauses 12-14 wherein the origination vehicle comprises a police vehicle.

Clause 16. The method of any of clauses 12-15 wherein the receiving device comprises: an RSU, an ICU, a VRU, or a receiving vehicle.

Clause 17. The method of clause 16 wherein the receiving device comprises the RSU or the ICU and wherein: the method further comprises determining one or more recipient RSUs to which to transmit the second alert message based at least in part on: the location of the origination vehicle, the heading of the origination vehicle, and for each recipient RSU of the one or more recipient RSUs, a location of the respective RSU; and transmitting the second alert message comprises sending the second alert message to the one or more recipient RSUs.

Clause 18. The method of clause 16 wherein the receiving device comprises the RSU and wherein the method further comprises sounding an alarm at the RSU.

Clause 19. The method of any of clauses 16-18 wherein determining the second alert message is based at least in part on: the location of the origination vehicle, the heading of the origination vehicle, and a location of the receiving device; and wherein the receiving device comprises the RSU or the receiving vehicle.

Clause 20. The method of any of clauses 16-19 further comprising including, in the second alert message, a message priority based at least in part on a distance between the location of the receiving device and the location of the origination vehicle.

Clause 21. The method of any of clause 16 wherein the receiving device comprises the receiving vehicle or the RSU.

Clause 22. The method of clause 16 wherein the receiving device comprises the receiving vehicle or the RSU, and wherein the transmitting the second alert message comprises sending the second alert message to: one or more VRUs, one or more additional vehicles, or any combinations thereof.

Clause 23. The method of any of clauses 12-22 wherein the first alert message comprises a basic safety message (BSM).

Clause 24. A origination vehicle providing erratic driving behavior detection and alerting, the origination vehicle comprising: one or more sensors; one or more transceivers; a memory; and one or more processors communicatively coupled with the one or more sensors, the one or more transceivers, and the memory, wherein the one or more processors are configured to: detect, based on sensor information from the one or more sensors, erratic driving behavior of the origination vehicle; responsive to detecting the erratic driving behavior of the origination vehicle, generate an alert message at the origination vehicle, the alert message comprising: a location of the origination vehicle, a heading of the origination vehicle, or the detection of the erratic driving behavior of the origination vehicle, or any combinations thereof; and wirelessly transmit the alert message from the origination vehicle via the one or more transceivers.

Clause 25. The origination vehicle of clause 24, wherein the one or more sensors are configured to include, in the sensor information, information regarding: origination vehicle acceleration, a status of a vehicle system of the origination vehicle, a location of the origination vehicle relative to a roadway, physical behavior a driver of the origination vehicle, or behavior of a separate vehicle, or any combinations thereof.

Clause 26. The origination vehicle of clause 25 wherein origination vehicle comprises a police vehicle and the one or more sensors are configured to include, in the information regarding the status of the vehicle system of the origination vehicle: whether emergency lights of the origination vehicle are activated, or whether sirens of the origination vehicle are activated, or any combinations thereof.

Clause 27. The origination vehicle of any of clauses 25-26 wherein origination vehicle comprises a police vehicle and the one or more sensors are configured to include, in the information regarding the physical behavior of the driver of the origination vehicle: detected eye motion of the driver of the origination vehicle, or electrocardiogram (ECG) signals detected from the driver of the origination vehicle, or any combinations thereof.

Clause 28. The origination vehicle of any of clauses 25-27 wherein the one or more sensors are configured to include, in the information regarding the behavior of the separate vehicle, a determination of erratic driving behavior of the separate vehicle from one or more cameras of the origination vehicle.

Clause 29. The origination vehicle of any of clauses 24-28 wherein the one or more processors are configured to include the alert message in a basic safety message (BSM).

Clause 30. The origination vehicle of any of clauses 24-29 wherein the one or more processors are configured to indicate the detection of the erratic driving behavior of the origination vehicle using a binary flag or a numerical scale within the alert message.

Clause 31. The origination vehicle of any of clauses 24-30 wherein the one or more processors are further configured to use a machine learning algorithm to process the sensor information from the one or more sensors.

Clause 32. The origination vehicle of clause 31 wherein the machine learning algorithm comprises a bi-directional long short term memory (BI-LSTM) neural network.

Clause 33. The origination vehicle of any of clauses 24-32 wherein, to wirelessly transmit the alert message from the origination vehicle, the one or more processors are configured to send the alert message to a roadside unit (RSU), an infrastructure control unit (ICU), a vulnerable Road user (VRU), or a separate vehicle, or any combination thereof.

Clause 34. A receiving device for propagating a first alert message of detected erratic driving behavior of an origination vehicle, the receiving device comprising: one or more transceivers; a memory; and one or more processors communicatively coupled with the one or more transceivers and the memory, wherein the one or more processors are configured to: receive the first alert message via the one or more transceivers, the first alert message comprising first information indicative of: a location of the origination vehicle, a heading of the origination vehicle, and detection of the erratic driving behavior of the origination vehicle; determine a second alert message with the receiving device; and transmit the second alert message via the one or more transceivers, the second alert message comprising second information indicative of: the location of the origination vehicle, the heading of the origination vehicle, or the detection of the erratic driving behavior of the origination vehicle, or any combinations thereof.

Clause 35. The receiving device of clause 34, wherein the one or more processors are configured to include the first alert message in the second alert message.

Clause 36. The receiving device of clause 35 wherein the one or more processors are configured to: increment or reduce a first number of hops, included in the first alert message, to obtain a second number of hops, and include the second number of hops in the second alert message.

Clause 37. The receiving device of any of clauses 34-36 wherein the receiving device comprises: an RSU, an ICU, a VRU, or a receiving vehicle.

Clause 38. The receiving device of any of clauses 34-37 wherein the receiving device comprises the RSU or the ICU and wherein: the one or more processors are configured to determine one or more recipient RSUs to which to transmit the second alert message based at least in part on: the location of the origination vehicle, the heading of the origination vehicle, and for each recipient RSU of the one or more recipient RSUs, a location of the respective RSU; and to transmit the second alert message, the one or more processors are configured to send the second alert message to the one or more recipient RSUs.

Clause 39. The receiving device of clause 38 wherein the receiving device comprises the RSU and wherein the one or more processors are configured to sound an alarm.

Clause 40. The receiving device of any of clauses 38-39 wherein, the one or more processors are configured to determine the second alert message based at least in part on the location of the origination vehicle, the heading of the origination vehicle, and a location of the receiving device; and wherein the receiving device comprises the RSU or the receiving vehicle.

Clause 41. The receiving device of any of clauses 38-40 wherein the one or more processors are further configured to include, in the second alert message, a message priority based at least in part on a distance between the location of the receiving device and the location of the origination vehicle.

Clause 42. The receiving device of clause 38 wherein the receiving device comprises the receiving vehicle or the RSU.

Clause 43. The receiving device of clause 38 wherein the receiving device comprises the receiving vehicle or the RSU, and wherein, to transmit the second alert message, the one or more processors are configured to send the second alert message to: one or more VRUs, one or more additional vehicles, or any combinations thereof.

Clause 44. The receiving device of any of clauses 34-43 wherein the one or more processors are configured to include the first alert message in a basic safety message (BSM).

Clause 45. An apparatus having means for performing the method of any one of clauses 1-23.

Clause 46. A non-transitory computer-readable medium storing instructions, the instructions comprising code for performing the method of any one of clauses 1-23.

What is claimed is:
1. A method of providing erratic driving behavior detection and alerting at an origination vehicle, the method comprising:
   detecting, based on sensor information from one or more sensors of the origination vehicle, erratic driving behavior of the origination vehicle;
   responsive to detecting the erratic driving behavior of the origination vehicle, generating an alert message at the origination vehicle, the alert message comprising:
      (i) a location of the origination vehicle or a heading of the origination vehicle,
      (ii) the detection of the erratic driving behavior of the origination vehicle, and
      (iii) a number of hops; and
   wirelessly transmitting the alert message from the origination vehicle.

2. The method of claim 1, wherein the sensor information comprises information regarding:
   origination vehicle acceleration,
   a status of a vehicle system of the origination vehicle,
   a location of the origination vehicle relative to a roadway,
   physical behavior a driver of the origination vehicle, or
   behavior of a separate vehicle, or
   any combinations thereof.

3. The method of claim 2, wherein origination vehicle comprises a police vehicle and the status of the vehicle system of the origination vehicle comprises:
   whether emergency lights of the origination vehicle are activated, or
   whether sirens of the origination vehicle are activated, or
   any combinations thereof.

4. The method of claim 2, wherein the information regarding the physical behavior of the driver of the origination vehicle comprises:
   detected eye motion of the driver of the origination vehicle, or
   electrocardiogram (ECG) signals detected from the driver of the origination vehicle, or
   any combinations thereof.

5. The method of claim 2, wherein the information regarding the behavior of the separate vehicle comprises a determination of erratic driving behavior of the separate vehicle from one or more cameras of the origination vehicle.

6. The method of claim 1, wherein the alert message comprises a basic safety message (BSM).

7. The method of claim 1, wherein the heading of the origination vehicle comprises a direction of travel of the origination vehicle and a street name.

8. The method of claim 1, further comprising using a machine learning algorithm to process the sensor information from the one or more sensors of the origination vehicle.

9. The method of claim 1, wherein wirelessly transmitting the alert message from the origination vehicle comprises sending the alert message to:
   a roadside unit (RSU),
   an infrastructure control unit (ICU),
   a vulnerable Road user (VRU), or
   a separate vehicle, or
   any combination thereof.

10. A method of propagating, at a receiving device, a first alert message of detected erratic driving behavior of an origination vehicle, the method comprising:
   receiving the first alert message at the receiving device, the first alert message comprising first information indicative of:
      (i) a location of the origination vehicle or a heading of the origination vehicle, and
      (ii) the detection of the erratic driving behavior of the origination vehicle;
   determining a second alert message with the receiving device; and
   transmitting the second alert message from the receiving device, the second alert message comprising second information indicative of:
      the location of the origination vehicle,
      the heading of the origination vehicle,
      the detection of the erratic driving behavior of the origination vehicle, or any combinations thereof;
   wherein the first alert message further comprises a first number of hops and the second alert message comprises a second number of hops, the second number of hops comprising the first number of hops, incremented or reduced by one.

11. The method of claim 10, wherein the second alert message comprises the first alert message.

12. The method of claim 10, wherein the receiving device comprises:
   an RSU,
   an ICU,
   a VRU, or
   a receiving vehicle.

13. The method of claim 12, wherein the receiving device comprises the RSU or the ICU and wherein:
   the method further comprises determining one or more recipient RSUs to which to transmit the second alert message based at least in part on:
      the location of the origination vehicle,
      the heading of the origination vehicle, and
      for each recipient RSU of the one or more recipient RSUs, a location of the respective RSU; and
   transmitting the second alert message comprises sending the second alert message to the one or more recipient RSUs.

14. The method of claim 12, wherein the receiving device comprises the RSU and wherein the method further comprises sounding an alarm at the RSU.

15. The method of claim 12, wherein determining the second alert message is based at least in part on:
   the location of the origination vehicle,
   the heading of the origination vehicle, and
   a location of the receiving device; and
   wherein the receiving device comprises the RSU or the receiving vehicle.

16. A origination vehicle providing erratic driving behavior detection and alerting, the origination vehicle comprising:
   one or more sensors;
   one or more transceivers;
   a memory; and
   one or more processors communicatively coupled with the one or more sensors, the one or more transceivers, and the memory, wherein the one or more processors are configured to:
      detect, based on sensor information from the one or more sensors, erratic driving behavior of the origination vehicle;
      responsive to detecting the erratic driving behavior of the origination vehicle, generate an alert message at the origination vehicle, the alert message comprising:
         (i) a location of the origination vehicle or a heading of the origination vehicle,
         (ii) the detection of the erratic driving behavior of the origination vehicle, and
         (iii) a number of hops; and
      wirelessly transmit the alert message from the origination vehicle via the one or more transceivers.

17. The origination vehicle of claim 16, wherein the one or more sensors are configured to include, in the sensor information, information regarding:
   origination vehicle acceleration,
   a status of a vehicle system of the origination vehicle,
   a location of the origination vehicle relative to a roadway,
   physical behavior a driver of the origination vehicle, or
   behavior of a separate vehicle, or
   any combinations thereof.

18. The origination vehicle of claim 17, wherein origination vehicle comprises a police vehicle and the one or more sensors are configured to include, in the information regarding the status of the vehicle system of the origination vehicle:
whether emergency lights of the origination vehicle are activated, or
whether sirens of the origination vehicle are activated, or
any combinations thereof.

19. The origination vehicle of claim 17, wherein origination vehicle comprises a police vehicle and the one or more sensors are configured to include, in the information regarding the physical behavior of the driver of the origination vehicle:
detected eye motion of the driver of the origination vehicle, or
electrocardiogram (ECG) signals detected from the driver of the origination vehicle, or
any combinations thereof.

20. The origination vehicle of claim 17, wherein the one or more sensors are configured to include, in the information regarding the behavior of the separate vehicle, a determination of erratic driving behavior of the separate vehicle from one or more cameras of the origination vehicle.

21. The origination vehicle of claim 16, wherein the one or more processors are configured to include the alert message in a basic safety message (BSM).

22. The origination vehicle of claim 16, wherein, to wirelessly transmit the alert message from the origination vehicle, the one or more processors are configured to send the alert message to:
a roadside unit (RSU),
an infrastructure control unit (ICU),
a vulnerable Road user (VRU), or
a separate vehicle, or
any combination thereof.

23. A receiving device for propagating a first alert message of detected erratic driving behavior of an origination vehicle, the receiving device comprising:
one or more transceivers;
a memory; and
one or more processors communicatively coupled with the one or more transceivers and the memory, wherein the one or more processors are configured to:
receive the first alert message via the one or more transceivers, the first alert message comprising first information indicative of:
(i) a location of the origination vehicle or a heading of the origination vehicle, and
(ii) the detection of the erratic driving behavior of the origination vehicle;
determine a second alert message; and
transmit the second alert message via the one or more transceivers, the second alert message comprising second information indicative of:
the location of the origination vehicle,
the heading of the origination vehicle,
the detection of the erratic driving behavior of the origination vehicle, or
any combinations thereof;
wherein the first alert message further comprises a first number of hops and the second alert message comprises a second number of hops, the second number of hops comprising the first number of hops, incremented or reduced by one.

24. The receiving device of claim 23, wherein the one or more processors are configured to include the first alert message in the second alert message.

25. The receiving device of claim 23, wherein the receiving device comprises:
an RSU,
an ICU,
a VRU, or
a receiving vehicle.

26. The receiving device of claim 25, wherein the receiving device comprises the RSU or the ICU and wherein:
the one or more processors are configured to determine one or more recipient RSUs to which to transmit the second alert message based at least in part on:
the location of the origination vehicle,
the heading of the origination vehicle, and
for each recipient RSU of the one or more recipient RSUs, a location of the respective RSU; and
to transmit the second alert message, the one or more processors are configured to send the second alert message to the one or more recipient RSUs.

27. The receiving device of claim 25, wherein the receiving device comprises the RSU and wherein the one or more processors are configured to sound an alarm.

28. The receiving device of claim 25, wherein, the one or more processors are configured to determine the second alert message based at least in part on:
the location of the origination vehicle,
the heading of the origination vehicle, and
a location of the receiving device; and
wherein the receiving device comprises the RSU or the receiving vehicle.

29. The method of claim 1, wherein the number of hops indicates:
a count of the number of hops accumulated in propagation of the alert message, or
a threshold number of hops the alert message is to undergo in propagation of the alert message.

30. The method of claim 16, wherein the number of hops indicates:
a count of the number of hops accumulated in propagation of the alert message, or
a threshold number of hops the alert message is to undergo in propagation of the alert message.

* * * * *